(12) United States Patent
Hwang et al.

(10) Patent No.: US 10,096,227 B2
(45) Date of Patent: Oct. 9, 2018

(54) ELECTRONIC APPARATUS AND ULTRAVIOLET AVOIDANCE INFORMATION PROVIDING METHOD THEREOF

(71) Applicant: Samsung Electronics Co., Ltd., Gyeonggi-do (KR)

(72) Inventors: Kyu-Youn Hwang, Seoul (KR); Sook-Jin Kim, Gyeonggi-do (KR); Joon-Ho Kim, Gyeonggi-do (KR); Jin-Gil Yang, Gyeonggi-do (KR); Tae-Han Jeon, Gyeonggi-do (KR); Yoon-Ju Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/095,772

(22) Filed: Apr. 11, 2016

(65) Prior Publication Data

US 2016/0300471 A1     Oct. 13, 2016

(30) Foreign Application Priority Data

Apr. 10, 2015   (KR) .................. 10-2015-0051159

(51) Int. Cl.
*G01J 1/02*       (2006.01)
*G01J 1/42*       (2006.01)
(Continued)

(52) U.S. Cl.
CPC ........ *G08B 21/0453* (2013.01); *G01J 1/0219* (2013.01); *G01J 1/429* (2013.01); *G01W 1/12* (2013.01); *G08B 21/24* (2013.01)

(58) Field of Classification Search
CPC ........ G01J 1/0219; G01J 1/4204; G01J 1/429; G01J 2001/4266; G01W 1/12
(Continued)

(56) References Cited

U.S. PATENT DOCUMENTS 6,936,824 B2   8/2005   Takada
8,044,363 B2   10/2011  Ales et al.
(Continued)

FOREIGN PATENT DOCUMENTS

JP     2014081294     5/2014

OTHER PUBLICATIONS

Fitzpatrick, Thomas B., MD, The Validity and Practicality of Sun-Reactive Skin Types I Through VI, Arch Dermatol-vol. 124, Jun. 1988, pp. 869-871.

*Primary Examiner* — Quan-Zhen Wang
*Assistant Examiner* — Stephen Burgdorf
(74) *Attorney, Agent, or Firm* — The Farrell Law Firm, P.C.

(57) ABSTRACT

An electronic apparatus and an ultraviolet avoidance information providing method are provided. The electronic apparatus includes a display; a biometric information acquisition module that acquires biometric information of a user; a location information acquisition module that acquires location information of a particular location; an ultraviolet intensity information acquisition module that acquires ultraviolet intensity information corresponding to the acquired location information; and a processor that controls the display to display ultraviolet avoidance information for avoiding ultraviolet light at the particular location based on the acquired biometric information and the acquired ultraviolet intensity information.

15 Claims, 17 Drawing Sheets

(51) Int. Cl.
*G01W 1/12* (2006.01)
*G08B 21/04* (2006.01)
*G08B 21/24* (2006.01)

(58) Field of Classification Search
CPC .... G06F 3/0482; G06F 3/0416; G06F 3/0488; G06F 3/04847; G08B 21/0453; G08B 21/24; H04W 4/008
USPC ...................................................... 340/573.1
See application file for complete search history.

(56) References Cited

U.S. PATENT DOCUMENTS

| | | |
|---|---|---|
| 8,796,212 B2 | 8/2014 | Zamora et al. |
| 9,068,887 B1* | 6/2015 | Bennouri .................. G01J 1/429 |
| 9,760,686 B2* | 9/2017 | Garnavi .............. G06F 19/3431 |
| 9,816,857 B2* | 11/2017 | Rastegar .................. G01J 1/429 |
| 9,823,120 B2* | 11/2017 | Lian ........................ G01J 1/429 |
| 2008/0203315 A1* | 8/2008 | Kasama .................. G01J 1/429 |
| | | 250/372 |
| 2009/0138244 A1 | 5/2009 | Schuler et al. |
| 2011/0191272 A1* | 8/2011 | McGuire .................. G06N 5/00 |
| | | 706/11 |
| 2014/0093148 A1* | 4/2014 | Williams .............. G06T 7/0016 |
| | | 382/128 |
| 2014/0121732 A1* | 5/2014 | Goren .................... A61K 31/12 |
| | | 607/95 |
| 2015/0041663 A1* | 2/2015 | Oliver .................... G01J 1/0219 |
| | | 250/372 |
| 2016/0069743 A1* | 3/2016 | McQuilkin ........... G01J 3/2803 |
| | | 356/416 |
| 2016/0084869 A1* | 3/2016 | Yuen ........................ G01P 7/00 |
| | | 73/510 |

* cited by examiner

| UV Index | UV EFFECTIVE IRRADIATION INTENSITY (W/m²) |
|---|---|
| 1 | 0.025 |
| 2 | 0.05 |
| 3 | 0.075 |
| 4 | 0.1 |
| 5 | 0.125 |
| 6 | 0.15 |
| 7 | 0.175 |
| 8 | 0.2 |
| 9 | 0.225 |
| 10 | 0.25 |
| 11 | 0.275 |

FIG.6
(PRIOR ART)

| SKIN TYPE | CHARACTERISTICS | MEDu (J/m2) |
|---|---|---|
| I | Always burns - never tans | 200~300 |
| II | Burns easily - tans minimally | 250~350 |
| III | Burns moderately - tans gradually to light brown | 300~500 |
| IV | Burns minimally - tans well to moderately brown | 450~600 |
| V | Rarely burns - tans profusely to dark brown | 600~1000 |
| VI | Never burns - tans profusely | 1000~2000 |

FIG.7
(PRIOR ART)

| PFA | PA |
|---|---|
| Less than 2 | - |
| 2 or more but less than 4 | PA+ |
| 4 or more but less thant 8 | PA++ |
| 8 or more | PA+++ |

FIG.9
(PRIOR ART)

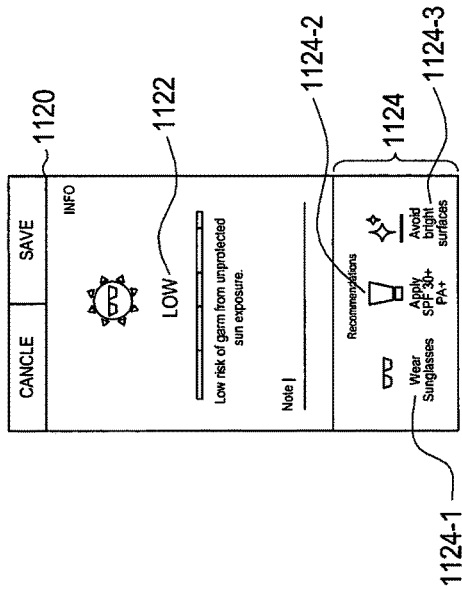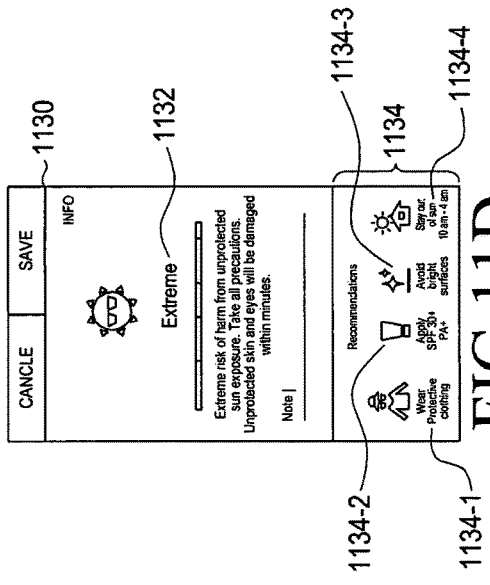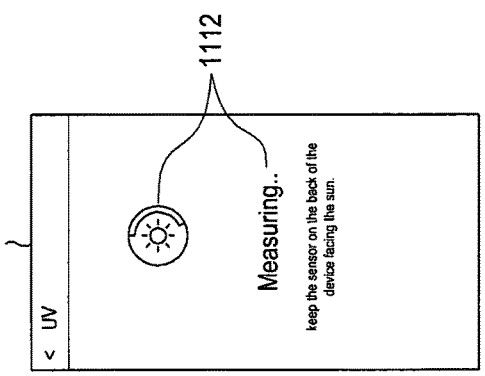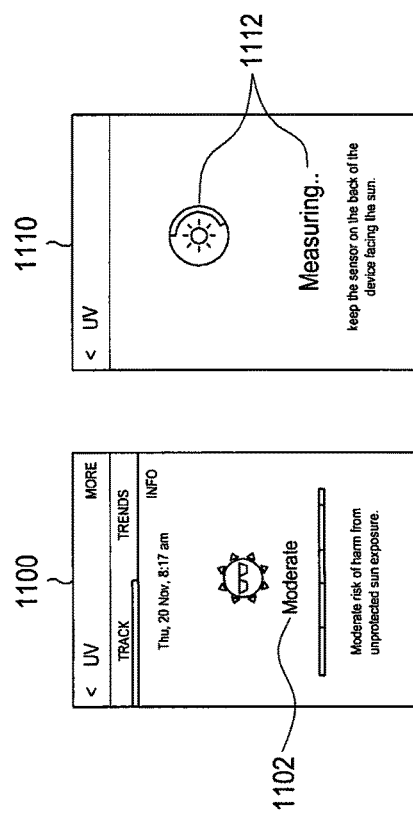
FIG. 11A FIG. 11B FIG. 11C FIG. 11D FIG. 11E

| FACTOR | CHARACTERISTIC |
|---|---|
| Time of day | UVB INTENSITY IS HIGHEST FOR 11 A.M. TO 1 P.M. |
| Time of year | NATIONALLY, UVA LIGHT HAS STRONGEST EFFECT ON SKIN FOR MAY TO JUNE, & UVB LIGHT HAS STRONGEST EFFECT ON SKIN FOR JULY TO AUGUST. |
| LATITUDE | UV INTENSITY IS HIGHEST ON EQUATOR. |
| HEIGHT ABOVE SEA LEVEL (ALTITUDE) | UV LIGHT INCREASES BY 10 TO 25% AS HEIGHT ABOVE SEA LEVEL INCREASES BY 1 KM (UVB LIGHT OF 300 NM INCREASES BY 24%, & UVA LIGHT OF 360 NM INCREASES BY 9%). |
| WEATHER | SCATTERED CLOUDS HARDLY HAVE ANY EFFECT. WHITE CLOUDS COVERING WHOLE SKY REDUCE UV LIGHT BY ABOUT 50%. |
| REFLECTIVITY OF EARTH'S SURFACE | LAWN HAS REFLECTIVITY OF 1 TO 2%. TYPICAL EARTH'S SURFACE HAS REFLECTIVITY OF 10% OR LESS. SAND HAS REFLECTIVITY OF 15 TO 30%. SNOW HAS REFLECTIVITY OF 30 TO 80%. |

FIG.14

ELECTRONIC APPARATUS AND ULTRAVIOLET AVOIDANCE INFORMATION PROVIDING METHOD THEREOF

PRIORITY

This application claims priority under 35 U.S.C. § 119(a) to Korean Patent Application Serial No. 10-2015-0051159, which was filed in the Korean Intellectual Property Office on Apr. 10, 2015, the entire content of which is hereby incorporated by reference.

BACKGROUND

1. Field of the Disclosure

The present disclosure relates generally to an electronic apparatus and, more particularly, to a method for providing ultraviolet avoidance information by an electronic apparatus.

2. Description of the Related Art

Due to recent progress in information communication technology, semiconductor technology, etc., the breadth of distribution and use of various electronic apparatuses have been rapidly increasing. In particular, electronic apparatuses users can carry with them and use to perform communications have been recently developed.

An electronic apparatus may provide functions in addition to basic communication functions, such as an alarm, a Short Message Service (SMS), a Multimedia Messaging Service (MMS), email, a game, remote control using short-range communication, an image-capturing function using a digital camera mounted thereon, a multimedia function for providing audio and video content, a scheduling function, and other similar functions.

Electronic apparatuses collect information required by users, measure various pieces of information related to the users, and provide various services by using the measured pieces of information. Due to recent user interest in personal health and information for maintaining health, electronic apparatuses are being developed to provide services which measure and provide various pieces of information related to health.

Information related to health may include ultraviolet information. When a user is exposed to ultraviolet light for a long time, the ultraviolet light may cause skin cancer, chloasma, wrinkles, a burn, etc., and thus may have a serious effect on the user's health. Accordingly, recently, the electronic apparatuses have been developed to provide information, such as an ultraviolet index etc., in order to prevent users from being exposed to ultraviolet light.

An electronic apparatus of the related art simply provides an ultraviolet index of a place where a user is located, or merely provides a notification according to the ultraviolet index. Accordingly, the electronic apparatus of the related art is problematic in that it cannot provide ultraviolet avoidance information which enables the user to more effectively avoid ultraviolet light. For example, the electronic apparatus of the related art is problematic in that it cannot provide each user with user-customized ultraviolet avoidance information.

SUMMARY

The present disclosure is made to address at least the above-mentioned problems and/or disadvantages and to provide at least the advantages described below.

Accordingly, an aspect of the present disclosure is to provide an electronic apparatus capable of providing user-customized ultraviolet avoidance information by using biometric characteristics of a user, activity information of the user, surrounding environment information of the user, and the like, and an ultraviolet avoidance information providing method thereof.

Also, another aspect of the present disclosure is to provide an electronic apparatus capable of predicting an ultraviolet exposure situation of a user and pre-providing ultraviolet avoidance information before the user is exposed to ultraviolet light, and an ultraviolet avoidance information providing method thereof.

Still another aspect of the present disclosure is to provide an electronic apparatus capable of notifying a user of reapplication of a sunscreen at a time point when the sunscreen needs to be reapplied to the user, and an ultraviolet avoidance information providing method thereof.

Further, another aspect of the present disclosure is to provide an electronic apparatus capable of notifying a user of whether a part of a user's skin to which a sunscreen is applied is reapplied, according to the part of the user's skin, and the degree of the application when the user applies the sunscreen to the user's skin, and an ultraviolet avoidance information providing method thereof.

In accordance with an aspect of the present disclosure, an electronic apparatus is provided. The electronic apparatus includes a display; a biometric information acquisition module that acquires biometric information of a user; a location information acquisition module that acquires location information of a particular location; an ultraviolet intensity information acquisition module that acquires ultraviolet intensity information corresponding to the acquired location information; and a processor that controls the display to display ultraviolet avoidance information for avoiding ultraviolet light at the particular location based on the acquired biometric information and the acquired ultraviolet intensity information.

In accordance with another aspect of the present disclosure, a method for providing ultraviolet avoidance information is provided. The method includes acquiring biometric information of a user; acquiring location information of a particular location; acquiring ultraviolet intensity information corresponding to the acquired location information; and displaying, on a display, ultraviolet avoidance information for avoiding ultraviolet light at the particular location based on the acquired biometric information and the acquired ultraviolet intensity information.

Also, in accordance with still another aspect of the present disclosure, a non-transitory storage medium that stores a program for providing ultraviolet avoidance information is provided. The program causes an electronic apparatus to perform operations including acquiring biometric information of a user; acquiring location information of a particular location; acquiring ultraviolet intensity information corresponding to the acquired location information; and displaying, on a display, ultraviolet avoidance information for avoiding ultraviolet light at the particular location based on the acquired biometric information and the acquired ultraviolet intensity information.

BRIEF DESCRIPTION OF THE DRAWINGS

The above and other aspects, features, and advantages of the present disclosure will be more apparent from the following detailed description taken in conjunction with the accompanying drawings, in which:

FIG. 6 is a table illustrating an ultraviolet (UV) effective irradiation intensity for each UV Index (UVI) according to an embodiment of the present disclosure;

FIG. 7 is a table illustrating characteristics and the value of a minimal erythema dose in unprotected skin (MEDu) for each skin type according to an embodiment of the present disclosure;

FIG. 9 is a table showing a correlation between a PFA and a protection grade of UVA (PA) according to an embodiment of the present disclosure;

FIGS. 11A, 11B, 11C, 11D, 11E, 12A, 12B, and 12C are diagrams illustrating screens that provide UV avoidance information according to embodiments of the present disclosure;

FIG. 14 is a table showing factors and characteristics used to set a sunscreen reapplication time period according to an embodiment of the present disclosure;

DETAILED DESCRIPTION OF EMBODIMENTS OF THE DISCLOSURE

Figure 1:
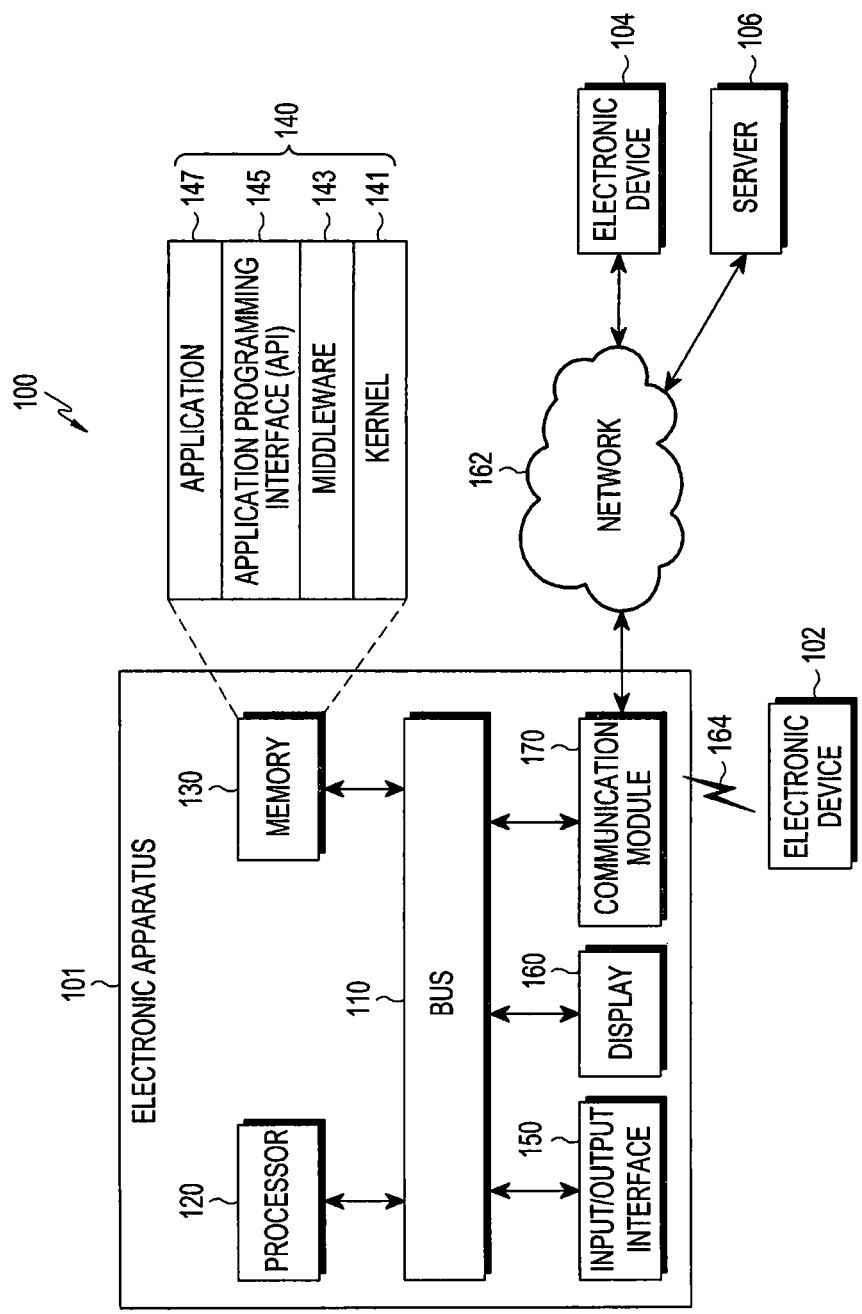
FIG. 1 is a diagram illustrating a network environment including an electronic apparatus according to an embodiment of the present disclosure.

Hereinafter, various embodiments of the present disclosure will be described with reference to the accompanying drawings. Accordingly, those of ordinary skill in the art will recognize that there is no intent to limit the present disclosure to the particular embodiments described herein; rather, it is intended that the present disclosure should be construed to cover various modifications, equivalents, and/or alternatives of embodiments of the present disclosure. The present disclosure should be construed to cover various modifications, equivalents, and/or alternatives of embodiments of the present disclosure. With regard to the description of the drawings, the same or similar reference numerals may be used to designate the same or similar constituent elements.

The expressions "have", "may have", "include", and "may include" indicate the existence of a corresponding feature (e.g., numeral, function, operation, or constituent element such as component), and do not exclude the existence of one or more additional features.

The expressions "A or B", "at least one of A or/and B", "one or more of A or/and B", etc., may include all possible combinations of the items listed. For example, the expression "A or B", "at least one of A and B", or "at least one of A or B" refers to each of (1) including at least one A, (2) including at least one B, or (3) including all of at least one A and at least one B.

The expression "a first", "a second", "the first", "the second", etc., as used herein, may modify various components regardless of the order and/or the importance of the components, but does not limit the corresponding components. Accordingly, a first user device and a second user device indicate different user devices although both of them are user devices. For example, a first element may be referred to as a second element, and similarly, a second element may be referred to as a first element without departing from the scope of the present disclosure.

When an element (e.g., a first element) is referred to as being (operatively or communicatively) "connected," or "coupled," to another element (e.g., second element), it may be directly connected or coupled directly to the other element or any other element (e.g., third element) may be interposer between them. However, when an element (e.g., first element) is referred to as being "directly connected," or "directly coupled" to another element (second element), there are no element (e.g., third element) interposed between them.

The expression "configured to", as used herein, may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may refer to a dedicated processor (e.g. an embedded processor) used only for performing the corresponding operations, or a generic-purpose processor (e.g., a central processing unit (CPU) or an application processor (AP)) that can perform the corresponding operations by executing one or more software programs stored in a memory device.

An electronic device according to an embodiment of the present disclosure may include a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a motion picture experts group (MPEG)-1 audio layer-3 (MP3) player, a mobile medical device, a camera, and a wearable device.

According to an embodiment of the present disclosure, a wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to an embodiment of the present disclosure, the electronic device may be a home appliance. The home appliance may include a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a television box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), vehicle infotainment devices, an electronic devices for a ship (e.g., a navigation device for a ship, and a gyro-compass), avionics, security devices, an automotive head unit, a robot for home or industry, an automatic teller machine (ATM), point of sales (POS) devices in a shop, or Internet of Things devices (e.g., a light bulb, various sensors, electric or gas meter, a sprinkler device, a fire alarm, a thermostat, a streetlamp, a toaster, a sporting goods, a hot water tank, a heater, a boiler, etc.).

According to an embodiment of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may be a flexible device. Further, electronic devices according to an embodiment of the present disclosure are not limited to the aforementioned devices, and may include new electronic devices according to new developments of technology.

Hereinafter, electronic devices according to embodiments of the present disclosure are described with reference to the accompanying drawings. As used herein, the term "user" may indicate a person who uses an electronic device or a device (e.g., an artificial intelligence electronic device) that uses an electronic device.

FIG. 1 is a diagram illustrating a network environment including an electronic apparatus according to an embodiment of the present disclosure.

Referring to FIG. 1, an electronic apparatus 101 is included within a network environment 100. The electronic apparatus 101 includes a bus 110, a processor 120, a memory 130, an input/output interface 150, a display 160, and a communication interface 170. One or more of the above elements of the electronic apparatus 101 may be omitted from the electronic apparatus 101, or the electronic apparatus 101 may additionally include other elements.

The bus 110 may include, for example, a circuit that interconnects the elements 110 to 170 and delivers a communication (e.g., a control message and/or data) between the elements 110 to 170.

The processor 120 may include one or more of a central processing unit (CPU), an application processor (AP), and a communication processor (CP). The processor 120 may perform, for example, calculations or data processing related to control over and/or communication by at least one of the other elements of the electronic apparatus 101.

The memory 130 may include a volatile memory and/or a non-volatile memory. The memory 130 may store, for example, commands or data related to at least one of the other elements of the electronic apparatus 101. According to an embodiment of the present disclosure, the memory 130 may store software and/or a program 140. The program 140 includes, for example, a kernel 141, middleware 143, an Application Programming Interface (API) 145, and/or an application program (or an application) 147. At least some of the kernel 141, the middleware 143, and the API 145 may be referred to as an operating system (OS).

For example, the kernel 141 may control or manage system resources (e.g., the bus 110, the processor 120, the memory 130, etc.) used to execute operations or functions implemented by the other programs (e.g., the middleware 143, the API 145, and the application program 147). Also, the kernel 141 may provide an interface capable of controlling or managing the system resources by accessing the individual elements of the electronic apparatus 101 by using the middleware 143, the API 145, or the application program 147.

For example, the middleware 143 may serve as an intermediary that enables the API 145 or the application program 147 to communicate with the kernel 141 and to exchange data therewith.

Also, the middleware 143 may process one or more task requests received from the application program 147 according to a priority. For example, the middleware 143 may assign a priority, which enables the use of system resources (e.g., the bus 110, the processor 120, the memory 130, etc.) of the electronic apparatus 101, to at least one of the application programs 147. For example, the middleware 143 may perform scheduling, load balancing, etc. of the one or more task requests by processing the one or more task requests according to the priority assigned to the at least one of the application programs 147.

The API 145 is an interface through which the application 147 controls a function provided by the kernel 141 or the middleware 143, and may include, for example, at least one interface or function (e.g., command) for file control, window control, image processing, character control, etc.

For example, the input/output interface 150 may serve as an interface capable of delivering a command or data, which is input from a user or another external device, to the element(s) other than the input/output interface 150 within the electronic apparatus 101. The input/output interface 150 may output, to the user or another external device, commands or data received from the element(s) other than the input/output interface 150 within the electronic apparatus 101.

The display 160 may include, for example, a liquid crystal display (LCD), a light-emitting diode (LED) display, an organic LED (OLED) display, a microelectromechanical systems (MEMS) display, and/or an electronic paper display. For example, the display 160 may display various pieces of content (e.g., text, images, videos, icons, symbols, etc.) to the user. The display 160 may include a touch screen, and may receive, for example, a touch input, a gesture input, a proximity input, or a hovering input provided by an electronic pen or a body part of the user.

The communication interface 170 may establish, for example, communication between the electronic apparatus 101 and an external apparatus (e.g., a first external electronic apparatus 102, a second external electronic apparatus 104, or a server 106). For example, the communication interface 170 may be connected to a network 162 through wireless or wired communication and may communicate with the external apparatus (e.g., the second external electronic apparatus 104 or the server 106).

The wireless communication may be performed by using at least one of, for example, long-term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), as a cellular communication protocol. The wireless communication may also include short-range communication 164. The short-range communication 164 may be performed by using at least one of, for example, Wi-Fi, Bluetooth, near field communication (NFC), and global navigation satellite system (GNSS). The GNSS may include at least one of, for example, a global positioning system (GPS), a global navigation satellite system (Glonass), a BeiDou navigation satellite system (BeiDou), and a European global satellite-based navigation system (Galileo), according to a use area, a bandwidth, etc. Herein, the term "GPS" may be interchangeably used with the term "GNSS." Wired communication may be performed by using at least one of, for example, a universal serial bus (USB), a high definition multimedia interface (HDMI), recommended standard 232 (RS-232), and a plain old telephone service (POTS). The network 162 may include at least one communication network, such as a computer network (e.g., a local area network (LAN), or a wide area network (WAN)), the Internet, and a telephone network.

Each of the first and second external electronic apparatuses 102 and 104 may be of a type identical to or different from a type of the electronic apparatus 101. According to an embodiment of the present disclosure, the server 106 may include a group of servers. At least some of operations performed by the electronic apparatus 101 may be performed by another electronic apparatus or multiple electronic apparatuses (e.g., the first and second external electronic apparatuses 102 and 104 and/or the server 106). When the electronic apparatus 101 needs to perform some functions or services automatically or by a request, the electronic apparatus 101 may send, to the first external electronic apparatus 102, the second external electronic apparatus 104, or the server 106, a request for performing at least some functions related to the functions or services, instead of performing the functions or services by itself, or additionally. Another electronic apparatus 102, 104, or the server 106 may execute the requested functions or the additional functions, and may deliver a result of the execution to the electronic apparatus 101. The electronic apparatus 101 may process the received result without any change or additionally and may provide the requested functions or services. To this end, use may be made of, for example, cloud computing technology, distributed computing technology, or client-server computing technology.

Figure 2:
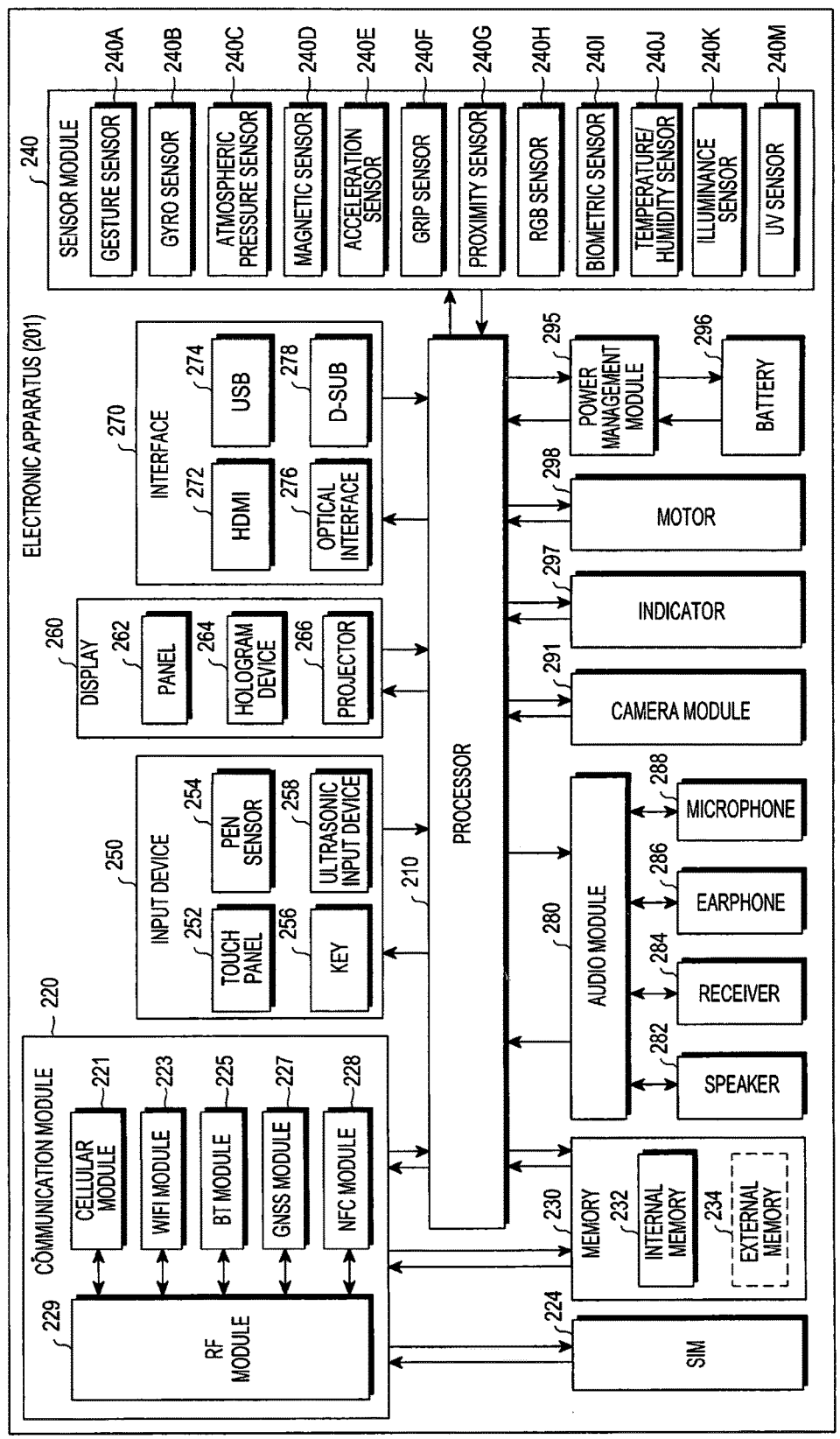
FIG. 2 is a block diagram illustrating a configuration of an electronic apparatus according to an embodiment of the present disclosure.

FIG. 2 is a block diagram illustrating a configuration of an electronic apparatus according to an embodiment of the present disclosure. The electronic apparatus of FIG. 2 may include all or a part of the electronic apparatus 101 illustrated in FIG. 1.

Referring to FIG. 2, an electronic apparatus 201 includes at least one processor (e.g., an Application Processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware or software elements connected to the processor 210 by running, for example, an operation system (OS) or an application program, and may perform the processing of and arithmetic operations on various data. The processor 210 may be implemented by, for example, a system on chip (SoC). According to an embodiment of the present disclosure, the processor 210 may further include a graphical processing unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration identical or similar to a configuration of the communication interface 170 illustrated in FIG. 1. The communication module 220 may include, for example, the cellular module 221, a Wi-Fi module 223, a Bluetooth (BT) module 225, a GNSS module 227 (e.g., a GPS module, a Glonass module, a Beidou module, or a Galileo module), an NFC module 228, and a Radio Frequency (RF) module 229.

For example, the cellular module 221 may provide a voice call, an image call, a text message service, an Internet service, etc. through a communication network. According to an embodiment of the present disclosure, the cellular module 221 may identify or authenticate an electronic apparatus 201 in the communication network by using the subscriber identification module (e.g., a Subscriber Identity Module (SIM) card) 224. The cellular module 221 may perform at least some of the functions provided by the processor 210. The cellular module 221 may include a Communication Processor (CP).

Each of the Wi-Fi module 223, the BT module 225, the GNSS module 227, and the NFC module 228 may include, for example, a processor for processing data transmitted and received through the relevant module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit and receive, for example, communication signals (e.g., RF signals). The RF module 229 may include, for example, a transceiver, a power amplifier module (PAM), a frequency filter, a low noise amplifier (LNA), and an antenna. According to another embodiment of the present disclosure, at least one of the cellular module 221, the Wi-Fi module 223, the BT module 225, the GNSS module 227, and the NFC module 228 may transmit and receive RF signals through a separate RF module.

The subscriber identification module 224 may include, for example, a card including a subscriber identity module and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) may include, for example, an internal memory 232 or an external memory 234. The internal memory 232 may include at least one of, for example, a volatile memory (e.g., a dynamic random access memory (DRAM), a static RAM (SRAM), a synchronous DRAM (SDRAM), etc.); a non-volatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, etc.); a hard drive; and a solid state drive (SSD).

The external memory 234 may further include a flash drive, for example, a compact flash (CF) memory, a secure digital (SD) memory, a micro-SD (Micro-SD) memory, a mini-SD (Mini-SD) memory, an extreme digital (xD) memory, a multi-media card (MMC), a memory stick, etc. The external memory 234 may be functionally and/or physically connected to the electronic apparatus 201 through various interfaces.

The sensor module 240 may measure a physical quantity or may detect an operation state of the electronic apparatus 201, and may convert the measured physical quantity or the detected operation state into an electrical signal. The sensor module 240 includes, for example, a gesture sensor 240A, a gyro sensor 240B, an atmospheric pressure sensor 240C, a magnetic sensor 240D, an acceleration sensor 240E, a grip sensor 240F, a proximity sensor 240G, a red-green-blue (RGB) sensor 240H, a biometric sensor 240I, a temperature/humidity sensor 240J, an illuminance sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include other sensors. The sensor module 240 may further include a control circuit for controlling one or more sensors included therein. According to an embodiment of the present disclosure, the electronic apparatus 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, and an ultrasonic input unit 258. The touch panel 252 may use at least one of, for example, a capacitive scheme, a resistive scheme, an infrared scheme, and an acoustic wave scheme. The touch panel 252 may further include a control circuit. The touch panel 252 may further include a tactile layer and may provide a tactile response to the user.

The (digital) pen sensor 254 may include, for example, a recognition sheet which is a part of the touch panel or is separated from the touch panel. The key 256 may be, for example, a physical button, an optical key, and a keypad. The ultrasonic input unit 258 may sense an ultrasonic wave generated by an input means through the microphone 288, and may confirm data corresponding to the sensed ultrasonic wave.

The display 260 (e.g., the display 160) includes a panel 262, a hologram unit 264, and a projector 266. The panel 262 may include a configuration identical or similar to that of the display 160 illustrated in FIG. 1. The panel 262 may be, for example, flexible, transparent, or wearable. The panel 262 and the touch panel 252 may be implemented as one module. The hologram unit 264 may display a three-dimensional image in the air by using the interference of light. The projector 266 may display an image by projecting light onto a screen. The screen may be located, for example, inside or outside the electronic apparatus 201. According to an embodiment of the present disclosure, the display 260 may further include a control circuit for controlling the panel 262, the hologram unit 264, or the projector 266.

The interface 270 includes, for example, a high-definition multimedia interface (HDMI) 272, a universal serial bus (USB) 274, an optical interface 276, and a D-subminiature (D-sub) 278. The interface 270 may be included in, for example, the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

For example, the audio module 280 may bidirectionally convert sounds to electrical signals and vice versa. At least some elements of the audio module 280 may be included in, for example, the input/output interface 150 illustrated in FIG. 1. The audio module 280 may process sound information that is input or output through, for example, a speaker 282, a receiver 284, an earphone 286, the microphone 288, etc.

The camera module 291 is capable of capturing a still image and a moving image. According to an embodiment of the present disclosure, the camera module 291 may include one or more image sensors (e.g., a front sensor or a back sensor), a lens, an image signal processor (ISP), and a flash (e.g., a light emitting diode (LED), a xenon lamp, etc.).

The power management module 295 may manage, for example, power of the electronic apparatus 201. According to an embodiment of the present disclosure, the power management module 295 may include a power management integrated circuit (PMIC), a charger IC, or a battery gauge. The PMIC may use a wired and/or wireless charging method. Examples of the wireless charging method may include, for example, a magnetic resonance method, a magnetic induction method, an electromagnetic method, etc. Additional circuits (e.g., a coil loop, a resonance circuit, a rectifier, etc.) for wireless charging may also be included in the power management module 295. The battery gauge may measure, for example, a residual quantity of power that may be supplied by the battery 296, a voltage, a current, or a temperature during charging. Examples of the battery 296 include a rechargeable battery and a solar battery.

The indicator 297 may display a particular state (e.g., a booting state, a message state, a charging state, etc.) of the electronic apparatus 201 or a part (e.g., the processor 210) of the electronic apparatus 201. The motor 298 may convert an electrical signal into mechanical vibration, and may generate vibration, a haptic effect, or the like. Although not illustrated, the electronic apparatus 201 may include a processing unit (e.g., a GPU) for supporting a mobile television (TV). The processing unit for supporting a mobile TV may process media data according to a standard, such as, for example, digital multimedia broadcasting (DMB), digital video broadcasting (DVB), or mediaFLO™.

Each of the above-described component elements of hardware according to the present disclosure may be configured with one or more components, and the names of the corresponding component elements may vary based on the type of electronic device. An electronic device according to an embodiment of the present disclosure may include at least one of the aforementioned elements. Some elements may be omitted or other additional elements may be further included in the electronic device. Some of the hardware components may be combined into one entity that may perform functions identical to those of the relevant corresponding components.

Figure 3:
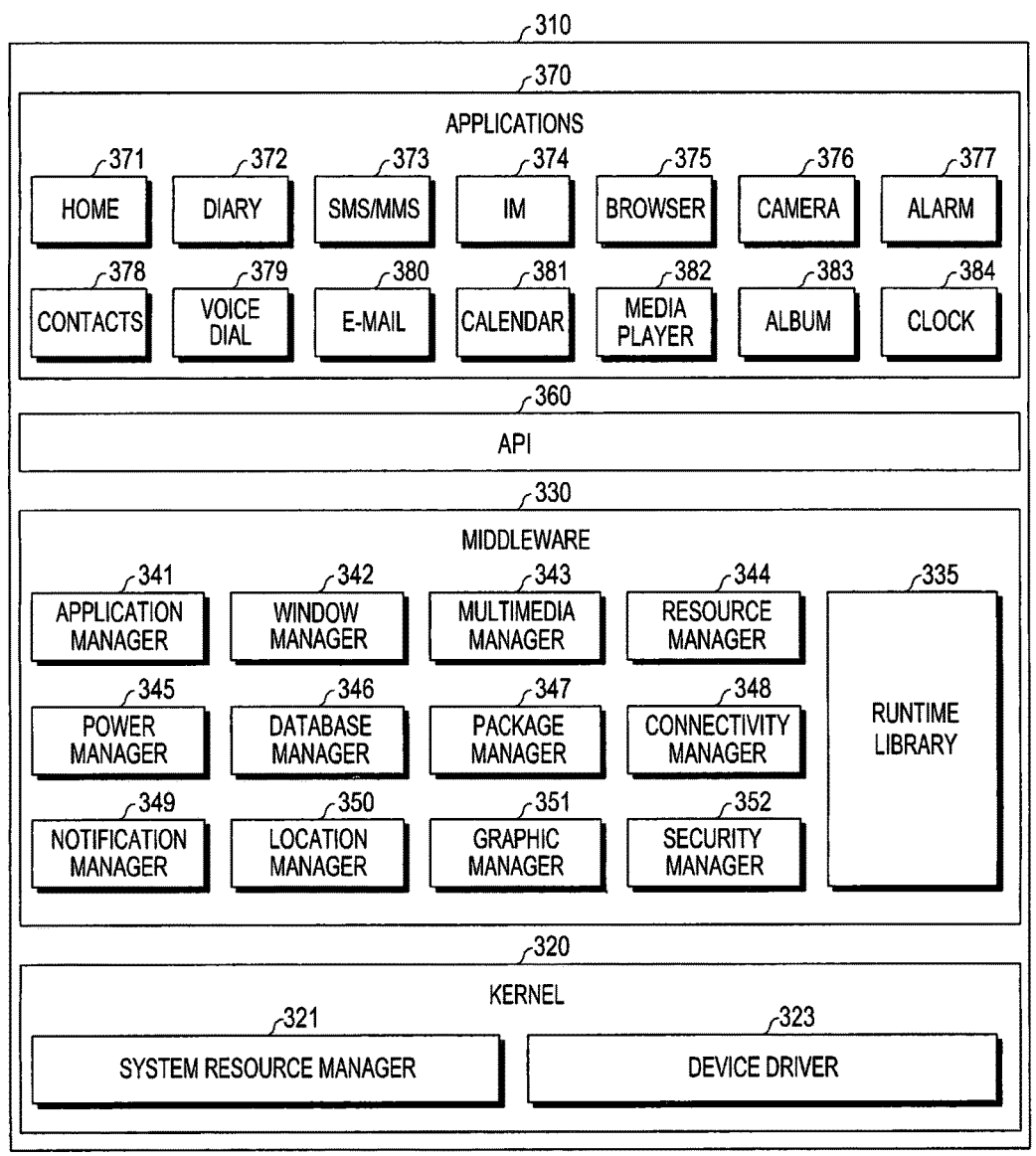
FIG. 3 is a block diagram illustrating a configuration of a program module according to an embodiment of the present disclosure.

FIG. 3 is a block diagram illustrating a configuration of a program module according to various embodiments of the present disclosure.

Referring to FIG. 3, according to an embodiment of the present disclosure, a program module 310 (e.g., the program 140) may include an OS for controlling resources related to the electronic apparatus (e.g., the electronic apparatus 101) and/or various applications (e.g., the application programs 147) executed in the OS. The OS may be, for example, Android, iOS, Windows, Symbian, Tizen, Bada, etc.

The program module 310 may include a kernel 320, middleware 330, an API 360, and/or an application 370. At least some of the program module 310 may be preloaded on the electronic apparatus, or may be downloaded from an external electronic apparatus (e.g., the electronic apparatus 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, etc. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

For example, the middleware 330 may provide a function required in common by the applications 370, or may provide various functions to the applications 370 through the API 360 so as to enable the applications 370 to efficiently use the limited system resources within the electronic apparatus. According to an embodiment of the present disclosure, the middleware 330 (e.g., the middleware 143) includes, for example, a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add a new function by using a programming language during the execution of the application 370. The runtime library 335 may perform input/output management, memory management, the functionality for an arithmetic function, etc.

The application manager 341 may manage, for example, the life cycle of at least one of the applications 370. The window manager 342 may manage graphical user interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, etc. of at least one of the applications 370.

For example, the power manager 345 may operate together with a basic input/output system (BIOS), etc. and may manage a battery or power, and may provide power information and the like required for an operation of the electronic apparatus. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, etc., in such a manner that does not disturb the user. The location manager 350 may manage location information of the electronic apparatus. The graphic manager 351 may manage a graphic effect to be provided to the user, or a user interface related to the graphic effect. The security manager 352 may provide various security functions required for system security, user authentication, etc. According to an embodiment of the present disclosure, when the electronic apparatus 101 has a telephone call function, the middleware 330 may further include a telephony manager for managing a voice call function or a video call function of the electronic apparatus.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include one or more applications capable of performing functions, such as, for example, a home 371, a dialer 372, an SMS/MMS 373, an Instant Message (IM) 374, a browser 375, a camera 376, an alarm 377, a contact 378, a voice dialer 379, an email 380, a calendar 381, a media player 382, an album 383, a clock 384, health care (e.g., which measures an amount of exercise, a blood sugar level, etc.), and a function of providing of environmental information (e.g., information on atmospheric pressure, humidity, temperature, etc.).

According to an embodiment of the present disclosure, the applications 370 may include an information exchange application that supports information exchange between the electronic apparatus 101 and the external electronic apparatus 102 or 104. Examples of the information exchange application include a notification relay application for delivering particular information to an external electronic apparatus and a device management application for managing an external electronic apparatus.

For example, the notification relay application may include a function of delivering, to the electronic apparatus 102 or 104, notification information generated by other applications (e.g., an SMS/MMS application, an email application, a health care application, an environmental information application, etc.) of the electronic apparatus 101. The notification relay application may receive notification information from the external electronic apparatus and may provide the received notification information to the user.

The device management application may manage (e.g., install, delete, or update), for example, at least one function (e.g., turning on/off the external electronic apparatus itself (or some component parts thereof) or adjusting the brightness (or resolution) of the display) of the external electronic apparatus electronic apparatus 102 or 104 communicating with the electronic apparatus, an application executed in the external electronic apparatus, or a service (e.g., a telephone call service, a message service, etc.) provided by the electronic apparatus.

According to an embodiment of the present disclosure, the application 370 may include an application (e.g., a health care application of a mobile medical device or the like) designated according to an attribute of the external electronic apparatus 102 or 104. The application 370 may include an application received from the external electronic apparatus (e.g., the server 106, or the electronic apparatus 102 or 104). The application 370 may include a preloaded application or a third party application which can be downloaded from the server. Names of the elements of the program module 310, according to the above-described embodiments of the present disclosure, may change depending on the type of OS.

According to an embodiment of the present disclosure, at least some of the program module 310 may be implemented in software, firmware, hardware, or a combination of two or more thereof. At least a part of the program module 310 may, for example, be implemented (e.g., executed) by a processor (e.g., the processor 210). At least a part of the program module 310 may include, for example, a module, a program, a routine, a set of instructions, and/or a process for performing one or more functions.

According to an embodiment of the present disclosure, the electronic apparatus may include a display, a biometric information acquisition module that acquires biometric information of the user, a location information acquisition module that acquires location information, a UV information acquisition module that acquires UV intensity information corresponding to the acquired location, and a processor configured to display, on the display, UV avoidance information which enables the avoidance of UV light at the acquired location on the basis of the acquired biometric information and the acquired UV intensity information.

The processor may predict a UV exposure time period, and may display the UV avoidance information during the predicted UV exposure time period.

The biometric information may include at least one piece of information among the activity amount of the user, the generation amount of sweat of the user, the body temperature of the user, the moisture level of the skin of the user, the skin tone of the user, and melanin information of the user.

The location information acquisition module may acquire, together, the location information and at least one piece of information among latitude and longitude information corresponding to the location information, information on the Sun corresponding to the location information, and weather information corresponding to the location information.

The location information may be one piece of information among current location information of the user and selected location information.

The processor may display the UV avoidance information according to one of an immediate time point, a preset time point, whether to be exposed to UV light, whether UV light can be measured, a result of predicting the exposure to UV light, and a state of the electronic apparatus.

The UV avoidance information may include at least one piece of information among a UV intensity index, sunscreen recommendation information, clothing information for blocking UV light, caution information that expresses caution about UV light, sunscreen reapplication information, and sunscreen application information.

The processor may be configured to calculate a sunscreen reapplication notification time period and to display a sunscreen reapplication notification if the sunscreen reapplication notification time period elapses, when sunscreen reapplication information is provided.

The processor may be configured to determine a sunscreen application part and the degree of the application in an image captured by using a UV filter of the camera, and to display sunscreen application information, when the sunscreen application information is provided.

Figure 4:
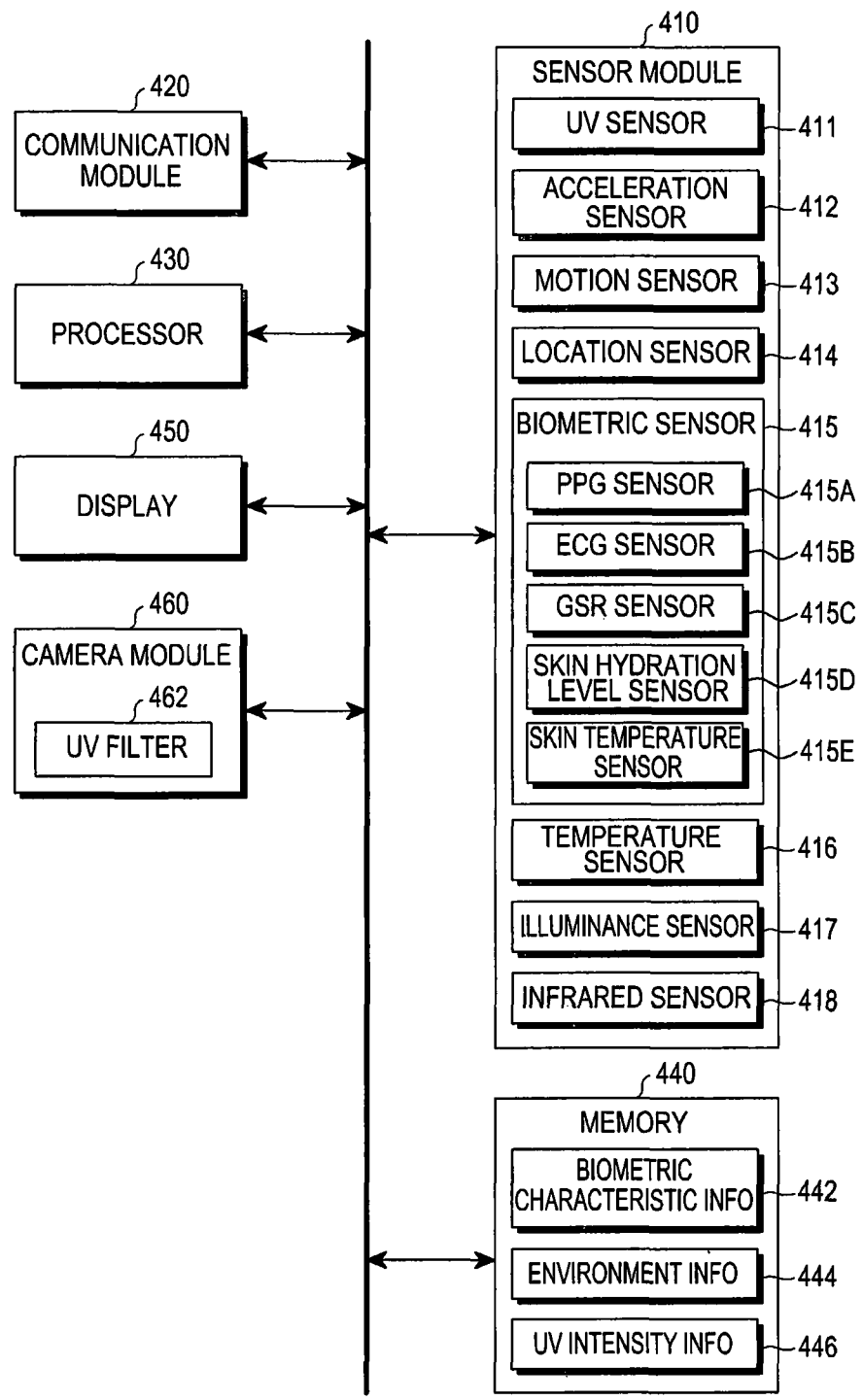
FIG. 4 is a block diagram illustrating a detailed configuration of an electronic apparatus according to an embodiment of the present disclosure.

FIG. 4 is a block diagram illustrating a detailed configuration of an electronic apparatus according to an embodiment of the present disclosure.

Referring to FIG. 4, a sensor module 410 included a UV sensor 411, an acceleration sensor 412, a motion sensor 413, a location sensor 414, a biometric sensor 415, a temperature sensor 416, and an illuminance sensor 417. The UV sensor 411 may sense UV light, convert a measurement value of the sensed UV light into an electrical signal, and output the electrical signal. The acceleration sensor 412 may detect an acceleration value according to the movement of the electronic apparatus and output the detected acceleration value as an electrical signal. According to an embodiment of the present disclosure, the acceleration sensor 412 may be a two-axis (X-axis and Y-axis) acceleration sensor and/or a three-axis (X-axis, Y-axis, and Z-axis) acceleration sensor. The motion sensor 413 may detect the motion of the electronic apparatus. For example, the motion sensor 413 may detect a direction of motion of the electronic apparatus, a slope thereof, etc., and output the detected direction of motion, the detected slope, etc. as electrical signals. The location sensor 414 may detect a location of the electronic apparatus. For example, the location sensor 414 may be a GPS sensor.

The biometric sensor 415 may detect a biometric signal of the user. The biometric sensor 415 may include, for example, a photoplethysmography (PPG) sensor 415A, an electrocardiogram (ECG) sensor 415B, a galvanic skin reflex (GSR) sensor 415C, a skin hydration level sensor 415D, and a skin temperature sensor 415E. The PPG sensor 415A, which is a kind of a heart rate sensor, may measure a transmission amount of light by using a light sensor, measure a change in the amount of blood within a blood vessel or an oxygen saturation level therewithin, and thereby measure a change in a blood flow rate. The measured change in the blood flow rate may be used to measure a heart rate. The ECG sensor 415B is also referred to as an electrocardiography (EKG) sensor, and may sense and output a pattern signal of an action current of a heart. The measured pattern signal of the action current of the heart may be used to measure a pulse. The GSR sensor 415C may be a current skin resistance response sensor. The GSR sensor 415C may be one of an electrodermal response (EDR) sensor, a psycho galvanic reflex (PGR) sensor, a skin conductance response (SCR) sensor. The GSR sensor 415C may include an ohmmeter, and may measure an electrical conductivity between two points on a skin. The GSR sensor 415C may cause a predetermined small amount of a current to flow through a skin of a human body, measure the electrical conductivity between the two points on the skin, and thereby output a skin resistance value. The measured electrical conductivity may be used to measure an amount of generated sweat. The skin hydration level sensor 415D may be implemented by sensors of various types, such as an electrical measurement sensor, an optical measurement sensor, a sensor using magnetic resonance imaging (MRI), etc., and may measure a skin hydration level, which is the moisture content of the stratum corneum of the skin of the user. The measured skin hydration level may be used to measure a skin moisture level. The skin temperature sensor 415E may measure a skin temperature by using an internal resistance change value, an internal voltage change value, or an internal current change value due to the heat of the human body in a state of coming close to or contacting a part of the human body, and may output the measured skin temperature. When a temperature change changes an internal resistance, an internal voltage, or an internal current, the temperature sensor 416 may measure a temperature by using an internal resistance change value, an internal voltage change value, or an internal current change value, and output the measured temperature. The illuminance sensor 417 may detect the amount of surrounding light and output the detected amount of the surrounding light. The infrared sensor 418 may detect infrared light and output the amount of the detected infrared light.

A communication module 420 may receive, from an external device, UV detection information or a UV index. The external device may be an external sensor or an external electronic apparatus. Examples of the external electronic apparatus include a weather information providing server of a meteorological office, an automobile, a wearable device, a mobile device, etc. The communication module 420 may receive location information from the external device. The communication module 420 may receive movement-related information from a nearby object (e.g., cosmetics, clothes, accessories, a wardrobe, a shoe rack, shoes, etc.) to which an electronic tag is attached, or with which the communication module 420 can communicate. The communication module 420 may receive, from the external device, service data associated with UV avoidance information. For example, the service data associated with the UV avoidance information may include data, such as a sunscreen purchase site, an application that is related to the purchase of a sunscreen, and/or the like. According to an embodiment of the present disclosure, at least one of the sensor module 410 and the communication module 420 may be a biometric information acquisition module that acquires biometric information. At least one of the location sensor 414 and the communication module 420 may be a location information acquisition module. At least one of the UV sensor 411 and the communication module 420 may be a UV information acquisition module.

The processor 430 may determine whether UV avoidance information is provided. The UV avoidance information may be information that the user requires to avoid UV light.

UV light may include UV-C (hereinafter referred to as "UVC") light having a wavelength of 200 to 290 nm, UV-B (hereinafter referred to as "UVB") light having a wavelength of 290 to 320 nm, and UV-A (hereinafter referred to as "UVA") light having a wavelength of 320 to 400 nm. UVC light, in comparison to other forms of UV light, has a shortest wavelength and has large energy, and may cause most serious damage to living organisms. However, UVC light is mostly absorbed by the ozone layer, and therefore, UVA light and UVB light affect people's daily lives. UVA light does not cause sunburn, but may cause pigmentation. When a skin is exposed to sunlight, UVA light may permeate deep into the skin, may reduce the skin's elasticity, may cause fine wrinkles, and may cause photo-aging, which is a skin aging phenomenon; and UVB light may cause erythema and inflammation, which are characterized by reddened and inflamed skin.

As indices representing the effects of blocking the UVA light and the UVB light, a protection grade of UVA (PA) or a protection factor in UVA (PFA) is used for UVA light, and a Sun Protection Factor (SPF) is used for UVB light. A PA is represented as PA+, PA++, or PA+++, and the effectiveness of the PA increases as the number of +'s increases. An SPF is represented as SPF20, SPF30, or SPF50, and the effectiveness of the SPF increases as the number of the SPF increases.

Typically, a person with lighter skin is sensitive to UVB light, and exposure to UV light only during a short time period is sufficient to cause a person with the white skin to suffer an erythema phenomenon more quickly than a person with darker skin, and the skin of the person with lighter skin is easily reddened. A person with darker skin is more sensitive to UVA light. Accordingly, when a person with darker skin and a person with lighter skin are exposed to UV light during an identical time period, the person with darker skin suffers a pigment darkening phenomenon more easily than the person with lighter skin, and is easily blackened. Therefore, it is necessary to provide UV avoidance information for avoiding UV light, according to intensity information of UV light and biometric information of the user, such as skin characteristics, skin color, etc. of each individual.

Also, the effects of UV light may depend on a surrounding environment. The intensity of UV light may depend on time, climate, season, latitude, and altitude. A UV index may be stronger at locations relatively closer to the equator or at a higher altitude, at a coastal area (in contrast to an inland area), in a rural area (in contrast to an urban area), and in summer (in contrast to winter). The amount of UV light becomes large around noon on a day, and UV light may be reduced by about 50% even on a cloudy day. Also, the intensity of UV light may be stronger in an outdoor area than in an indoor area. Accordingly, it is necessary to provide UV avoidance information for avoiding UV light according to environment information of the user.

According to an embodiment of the present disclosure, the processor 430 may acquire biometric information, environment information of the user, and UV intensity information, in order to provide UV avoidance information.

The biometric information of the user may include at least one piece of information among the activity amount of the user, the generation amount of sweat of the user, the body temperature of the user, the moisture level of the skin of the user, the skin tone of the user, and melanin information of the user. In addition, the biometric information of the user may further include any other pieces of information representing biometric characteristics of the user. The environment information may include location information, and may further include at least one piece of information among latitude and longitude information corresponding to the location information, information on the Sun corresponding to the location information, and weather information corresponding to the location information. The location information may be one piece of information among current location information of the user and selected location information. The selected location information may be one piece of information among information on a location that the user is to visit which is included in a schedule or an email of the user, location information of an external electronic apparatus, and location information existing on a movement path history of the user or an expected movement path of the user. The UV intensity information may include the intensity of at least one of UVA light, UVB light, and UVC light.

The processor 430 may determine whether the user moves, by using am acceleration measurement value obtained by the acceleration sensor 412, a motion measurement value obtained by the motion sensor 413, etc. The processor 430 may determine the amount of activity of the user by using a measurement value of a blood flow rate change obtained by the PPG sensor 415A, a measurement value of a pulse obtained by the ECG sensor 415B, etc. The processor 430 may determine an amount of generated sweat by using a measurement value of a skin resistance obtained by the GSR sensor 415C, determine a body temperature by using a measurement value of a skin temperature obtained by the skin temperature sensor 415E, and determine a skin moisture level, which is the moisture content of the stratum corneum of the skin, by using a measurement value of a skin hydration level obtained by the skin hydration level sensor 415D. Also, the processor 430 may determine a skin tone by using a result of photographing the skin by the camera module 460, and determine melanin information of the skin by using a result of measuring red light and infrared light by the PPG sensor 415A and the infrared sensor 418.

The processor 430 may acquire location information by using the location sensor 414, and may receive at least one piece of information from among latitude and longitude information corresponding to the location information, information on the Sun corresponding to the location information, and weather information corresponding to the location information, from an external server through the communication module 420.

The processor 430 may acquire the intensity of UV light by using a result of measuring the UV light sensed by the UV sensor 411, or may acquire the intensity of UV light from an external sensor or an external electronic apparatus. Examples of the external electronic apparatus may include a weather information providing server of a meteorological office, an automobile, a wearable device, a mobile device, and the like. The processor 430 may acquire the intensity of UV light corresponding to one piece of information among the current location information of the user and the selected location information.

The processor 430 may store, in a memory 440, the acquired biometric information 442, the acquired environment information 444, and the acquired UV intensity information 446. The processor 430 may calculate a UV blocking index by using the UV intensity information and the personal biometric information, and provide UV avoidance information by using the calculated UV blocking index. According to an embodiment of the present disclosure, the UV avoidance information may include at least one piece of information from among a UV intensity index, sunscreen recommendation information, clothing information for avoiding UV light, caution information for avoiding UV light, sunscreen reapplication information, and sunscreen application information. The processor 430 may display the UV avoidance information on the display 450.

When the sunscreen reapplication information is provided as the UV avoidance information, the processor 430 may calculate a sunscreen reapplication notification time period and notify a user regarding reapplication of sunscreen, if the sunscreen reapplication notification time period elapses.

When the sunscreen application information is provided as UV avoidance information, the processor 430 may activate the camera module 460, capture an image by using the UV filter 462, or capture an image of a user's skin by using a UV camera, determine, in the captured image, a part of the user to which the sunscreen is applied and the degree of the application, and provide the sunscreen application information. According to an embodiment of the present disclosure, the sunscreen application information may include at least one of a part to which a sunscreen needs to be applied, whether a sunscreen has been applied, and a part to which it is further required to apply a sunscreen. The sunscreen application information may further include information on a time period during which the application of a sunscreen is maintained, or a sunscreen reapplication notification time period.

According to an embodiment of the present disclosure, a method for providing UV avoidance information by the electronic apparatus may include acquiring biometric information of the user, acquiring location information, acquiring UV intensity information corresponding to the acquired location information, and displaying UV avoidance information, which enables avoidance of UV light at the acquired location, on the display on the basis of the acquired biometric information and the acquired UV intensity information.

The method may include predicting a UV exposure time period and providing the UV avoidance information during the predicted UV exposure time period.

The biometric information may include at least one piece of information from among the amount of activity of the user, the amount of generated sweat of the user, the body temperature of the user, the moisture level of the skin of the user, the skin tone of the user, and melanin information of the user.

The location information and at least one piece of information among latitude and longitude information corresponding to the location information, information on the Sun corresponding to the location information, and weather information corresponding to the location information are acquired together.

The location information may be one piece of information among current location information of the user and selected location information.

The UV avoidance information may be displayed according to at least one of an immediate time point, a preset time point, whether to be exposed to UV light, whether UV light can be measured, a result of predicting the exposure to UV light, and a state of the electronic apparatus.

The UV avoidance information may include at least one piece of information among a UV intensity index, sunscreen recommendation information, clothing information for blocking UV light, caution information for avoiding UV light, sunscreen reapplication information, and sunscreen application information.

When the sunscreen reapplication information is provided, a sunscreen reapplication notification time period may be calculated, and a sunscreen reapplication notification may be displayed if the sunscreen reapplication notification time period elapses.

When the sunscreen application information is provided, a sunscreen application part and a degree of the application in an image captured by using the UV filter of the camera or captured by a UV camera are determined, and the sunscreen application information may be displayed.

Figure 5:
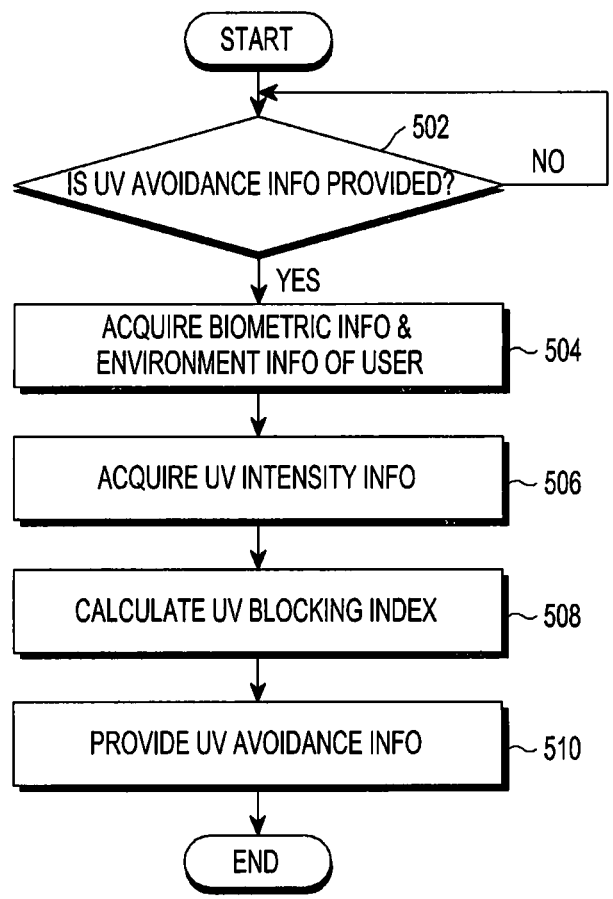
FIG. 5 is a flowchart illustrating an operation of an electronic apparatus for providing ultraviolet avoidance information according to an embodiment of the present disclosure.

FIG. 5 is a flowchart illustrating an operation of an electronic apparatus for providing UV avoidance information according to an embodiment of the present disclosure.

Referring to FIG. 5, in step 502, the electronic apparatus determines whether UV avoidance information is provided. According to an embodiment of the present disclosure, the electronic apparatus may determine whether the UV avoidance information is immediately provided, whether the UV avoidance information is provided according to a preset time point, whether the UV avoidance information is provided according to whether to be exposed to UV light, whether the UV avoidance information is provided according to whether UV light can be measured, whether the UV avoidance information is provided according to a result of predicting the exposure to UV light, or whether the UV avoidance information is provided according to a state of the electronic apparatus. According to an embodiment of the present disclosure, the UV avoidance information is information that the user utilizes to avoid UV light, and may include at least one piece of information from among a UV blocking index, a UV intensity index, sunscreen recommendation information, clothing information for avoiding UV light, caution information for avoiding UV light, sunscreen reapplication information, and sunscreen application information.

In step 504, the electronic apparatus acquires biometric information of the user and environment information of the user. According to an embodiment of the present disclosure, the biometric information of the user may include at least one piece of information from among the amount of activity of the user, the amount of generated sweat of the user, the body temperature of the user, the moisture level of the skin of the user, the skin tone of the user, and melanin information of the user. In addition, the biometric information of the user may further include any other pieces of information representing biometric characteristics of the user. The environment information may include location information, and may further include at least one piece of information among latitude and longitude information corresponding to the location information, information on the Sun corresponding to the location information, and weather information corresponding to the location information. The location information may be one piece of information among current location information of the user and selected location information. The selected location information may be one piece of information among information on a location that the user is to visit which is included in a schedule or an email of the user, location information of an external electronic apparatus, and location information existing on a movement path history of the user or an expected movement path of the user. The electronic apparatus may acquire biometric information of the user and environment information of the user which are pre-stored in the memory.

In step 506, the electronic apparatus may acquire UV intensity information. According to an embodiment of the present disclosure, the UV intensity information may include the UV intensity of at least one of UVA light, UVB light, and UVC light. The electronic apparatus may acquire the intensity of UV light by using a result of measuring the UV light sensed by the UV sensor, or may acquire the intensity of UV light from an external sensor or an external electronic apparatus. Examples of the external electronic apparatus include a weather information providing server of a meteorological office, an automobile, a wearable device, a mobile device, etc. The electronic apparatus may acquire the intensity of UV light corresponding to one piece of information among the current location information of the user and the selected location information.

In step 508, the electronic apparatus calculates a UV blocking index. According to an embodiment of the present disclosure, the electronic apparatus may calculate a UV blocking index by using the UV intensity information and the personal biometric information.

After the electronic apparatus calculates the UV blocking index, in step 510, the electronic apparatus may provide UV avoidance information. According to an embodiment of the present disclosure, the electronic apparatus may provide the UV avoidance information to the user through a visual, aural, or tactile output unit (e.g., a display, a speaker, an LED, an earphone connection terminal, an oscillator, etc.), or through an external electronic apparatus that is connected to the electronic apparatus by performing communication therewith. The display may display the UV avoidance information through a notification panel, a lock screen, a dedicated application, a schedule, a preview screen of the camera, etc. The UV avoidance information may include a UV blocking index. A UV blocking index may also be calculated for each time point or location, and the calculated UV blocking index may be provided for each time point or location. Alternatively, a maximum UV blocking index may be provided for each time point or location as a representative UV blocking index. The UV avoidance information may further include at least one piece of information among a UV intensity index, sunscreen recommendation information, clothing information for avoiding UV light, caution information for avoiding UV light, sunscreen reapplication information, and sunscreen application information.

According to various embodiments of the present disclosure, a UV blocking index may be either of an SPF and a PFA/PA. An SPF may be determined as a ratio of a minimal erythema dose in protected skin (hereinafter referred to as "MEDp") to a Minimal Erythema Dose in unprotected skin (hereinafter referred to as "MEDu"), and may be calculated according to Equation (1) below.

$$SPF = \frac{MEDp}{MEDu} \qquad (1)$$

For example, when a MEDu has a value equal to half the value of a MEDp, an SPF may be equal to 2. By using the relation defined by Equation (1), a MEDp may be replaced by a UV effective irradiance, a ratio of a UV effective irradiance to a MEDu may be calculated, and thereby the value of a minimum SPF required to protect a skin may be calculated by Equation (2) below.

When the UV effective irradiance is divided by the MEDu, the value of a minimum SPF required to protect a skin may be calculated by Equation (2) below.

Required minimum SPF=UV effective irradiance/ User's minimal erythema occurrence irradiance(=MEDu)  (2)

The value of a UV effective irradiation intensity may be used to calculate a UV effective irradiance.

A UV effective irradiance may be calculated by Equation (3) below.

UV effective irradiance=UV effective irradiation intensity×Expected exposure time period  (3)

According to Equation (3) above, a UV effective irradiance may be calculated by multiplying a UV effective irradiation intensity by an expected exposure time period.

A UV effective irradiation intensity is a UV intensity in which a weight according to each wavelength of UV light is reflected, and may be calculated from the definition of a UVI represented by Equation (4) below.

$$I_{UV}=K_{er} \cdot \int_{250\ nm}^{400\ nm} E_\lambda \cdot S_{er}(\lambda) d\lambda \qquad (4)$$

In Equation (4), $I_{UV}$ represents a UV index, and $K_{er}$, which represents a constant, may have a value of 40 m²/W.

FIG. 6 is a table illustrating a UV effective irradiation intensity for each UVI according to an embodiment of the present disclosure.

Referring to FIG. 6, the table shows a UV effective irradiation intensity for each UVI which is calculated by Equations (1) to (4). As can be noted from the table of FIG. 6, the value of the UV effective irradiation intensity may become greater as the value of the UVI increases. The UVI may be calculated by the electronic apparatus after the electronic apparatus measures UV light, or may be acquired from a weather information provider.

According to an embodiment of the present disclosure, the expected exposure time period may be received from the user, or may be set to a predetermined time period. For example, the U.S. Food and Drug Administration (FDA) recommends that a sunscreen should be reapplied every two hours. Alternatively, the expected exposure time period may be set by analyzing a result of tracking the location or activity of the user for each time zone in a predetermined cycle and recognizing a time zone during which the user enjoys outdoor activity. Alternatively, the expected exposure time period may be set according to schedule information of the user. For example, a determination of whether the user enjoys indoor or outdoor activity by using a location included in the schedule of the user, and the expected exposure time period may be set to a pre-stored basic activity time period starting from a start time point of the schedule, or may be set to a user-supplied time range of the schedule of the user.

Meanwhile, the MEDu refers to a UV irradiance, which causes erythema when UV light is irradiated onto a skin that has not been protected by sunscreen. The MEDu may depend on the skin type of the user, and it is typical that values of MEDu's may be distinguished for each skin type.

FIG. 7 is a table illustrating characteristics and the value of a MEDu for each skin type according to an embodiment of the present disclosure.

Referring to FIG. 7, skin type I is the type of a skin that is most easily burned by UV light, and the corresponding value of a MEDu may range from 200 to 300. Skin type II is easily burned by UV light, and the corresponding value of a MEDu may range from 250 to 350. Skin type III is moderately burned by UV light, and corresponding the value of a MEDu may range from 300 to 500. Skin type IV is minimally burned by UV light, and the corresponding value of a MEDu may range from 450 to 600. Skin type V is rarely burned by UV light, and the corresponding value of a MEDu may range from 600 to 1000. Skin type VI is never burned by UV light, and the corresponding value of a MEDu may range from 1000 to 2000.

The electronic apparatus may receive a skin type as input from the user and may acquire a MEDu, or may determine the value of the skin type according to a condition and may calculate the MEDu. For example, the electronic apparatus may set the MEDu of skin type III or IV as a MEDu of the user, or may determine a skin type according to a measurement location, a residential area, and race, and may calculate the MEDu of the user. Alternatively, the electronic apparatus may measure a skin tone of the user by using the camera or the light sensor, may determine the skin type of the user by using the measured skin tone, and may set the MEDu of the user.

As described above, the electronic apparatus may calculate the value of a minimum SPF, which is required to protect the skin, by dividing the UV effective irradiance by the MEDu.

Meanwhile, a PFA may be determined by a ratio of a minimal persistent pigment darkening dose in protected skin (hereinafter referred to as an "MPPDp") to a minimal persistent pigment darkening dose in unprotected skin (hereinafter referred to as an "MPPDu"), and may be calculated according to Equation (5) below.

$$PFA = \frac{MPPDp}{MPPDu} \quad (5)$$

According to Equation (5), a product may be a sunscreen. An MPPDp may be replaced by a UVA irradiance, a ratio of a UVA irradiance to an MPPDu may be calculated, and thereby a minimum PFA required to protect a skin may be calculated by Equation (6) below.

Required minimum PFA=UVA irradiance/User's minimal pigment darkening occurrence irradiance(=MPPDu) (6)

According to Equation (6), for example, when a person having an MPPDu of 8 is exposed to UVA light having an intensity of 80, the person may need a sunscreen having a minimum PFA of 10 or more.

A user's minimal pigment darkening occurrence irradiance (i.e., an MPPDu) is a minimum UVA irradiance which causes persistent pigment darkening (i.e., pigmentation) when the user is exposed to UVA light in a state where the user does not use a sunscreen. The value of an MPPDu depends or may depend on a skin type and a skin state of the user, and may be measured by using an artificial Sun irradiator in order to measure an accurate MPPDu. Alternatively, an MPPDu may be set to a predefined value (e.g., 10 J/cm$^2$). The set MPPDu may be a dose corresponding to a situation where the user is exposed to sunlight for about 30 minutes on a sunny day in summer. Alternatively, an MPPDu for each skin type may be determined by distinguishing between skin types by using a camera or an infrared sensor of the electronic apparatus or an external electronic apparatus.

Meanwhile, a UVA irradiance may be calculated according to Equation (7) below.

UVA irradiance=UVA intensity×Expected exposure time period (7)

According to Equation (7), a UVA irradiance may be calculated by multiplying a UVA intensity by an expected exposure time period. The expected exposure time period may be set by using a method similar to that of the case of an SPF. A UVA intensity may be measured by a UV sensor, or may be acquired from the external electronic apparatus. For example, the UVA intensity may be acquired by receiving UVA information from a weather information provider such as the Meteorological Office, or by receiving UVI information from the weather information provider and converting the received UVI information into UVA information. A UVA value according to a UVI may be calculated by a statistical method, the calculated UVA values may be generated in the form of a lookup table, and then the lookup table may be referenced when a UVA intensity is calculated. The lookup table may be stored in the memory of the electronic apparatus or the external electronic apparatus.

As described above, the electronic apparatus may divide the UVA effective irradiance by the MPPDu, and thereby may calculate a minimum PFA required to protect the skin with respect to the relevant light amount.

Figure 8:
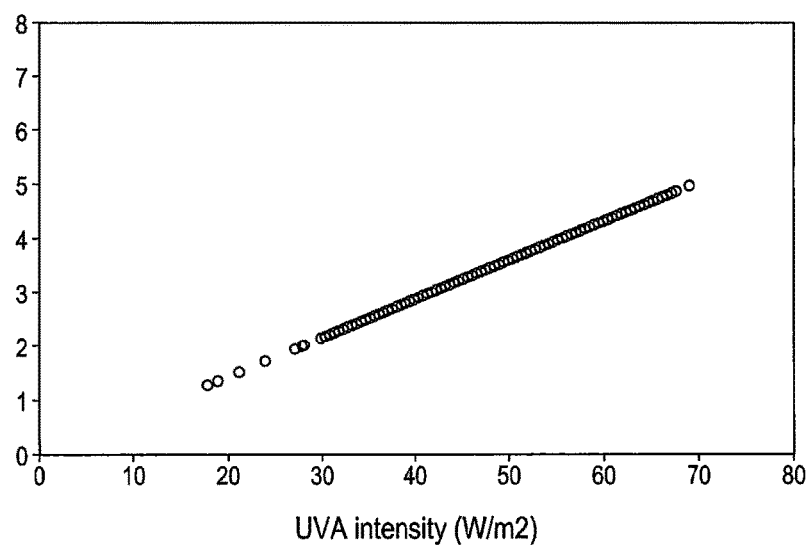
FIG. 8 is a graph illustrating an example of measuring a required value of a minimum protection factor of ultraviolet A (PFA) according to an ultraviolet A (UVA) intensity according to an embodiment of the present disclosure.

FIG. 8 is a graph illustrating an example of measuring a required value of a minimum PFA according to a UVA intensity according to an embodiment of the present disclosure.

Referring to FIG. 8, a UVA intensity is measured for one day in Brisbane, Australia, and a required value of a minimum PFA according to the measured UVA intensity is illustrated in a graph. The value of a minimum PFA according to a UVA intensity is as illustrated in FIG. 8 when a UV effective irradiance is measured by using the UV sensor, an expected exposure time period is set to 2 hours, and a user's minimal pigment darkening occurrence irradiance is set to 100 kJ/m$^2$. When the user performs outdoor activity for two hours, the application of a sunscreen having a minimum PFA illustrated in FIG. 8 can prevent a skin pigment darkening phenomenon. Accordingly, when the electronic apparatus predicts that the user is performing outdoor activity for two hours, the electronic apparatus may recommend the sunscreen having the minimum PFA illustrated in FIG. 8. The electronic apparatus may also perform a sunscreen reapplication notification after two hours of outdoor activity have elapsed, by using the require value of the minimum PFA according to the UVA intensity illustrated in FIG. 8.

Meanwhile, the electronic apparatus may calculate a PA by using a correlation between a PFA and the PA.

FIG. 9 is a table illustrating a correlation between a PFA and a PA according to an embodiment of the present disclosure.

Referring to FIG. 9, a UV blocking index may increase as a PFA index increases. When a PFA index is less than 2, the grade of a PA may not exist. When the PFA index is at least equal to 2 but is less than 4, the grade of the PA may be PA+. When the PFA index is at least equal to 4 but is less than 8, the grade of the PA may be PA++. When the PFA index is more than or equal to 8, the grade of the PA may be PA+++.

Figure 10A:
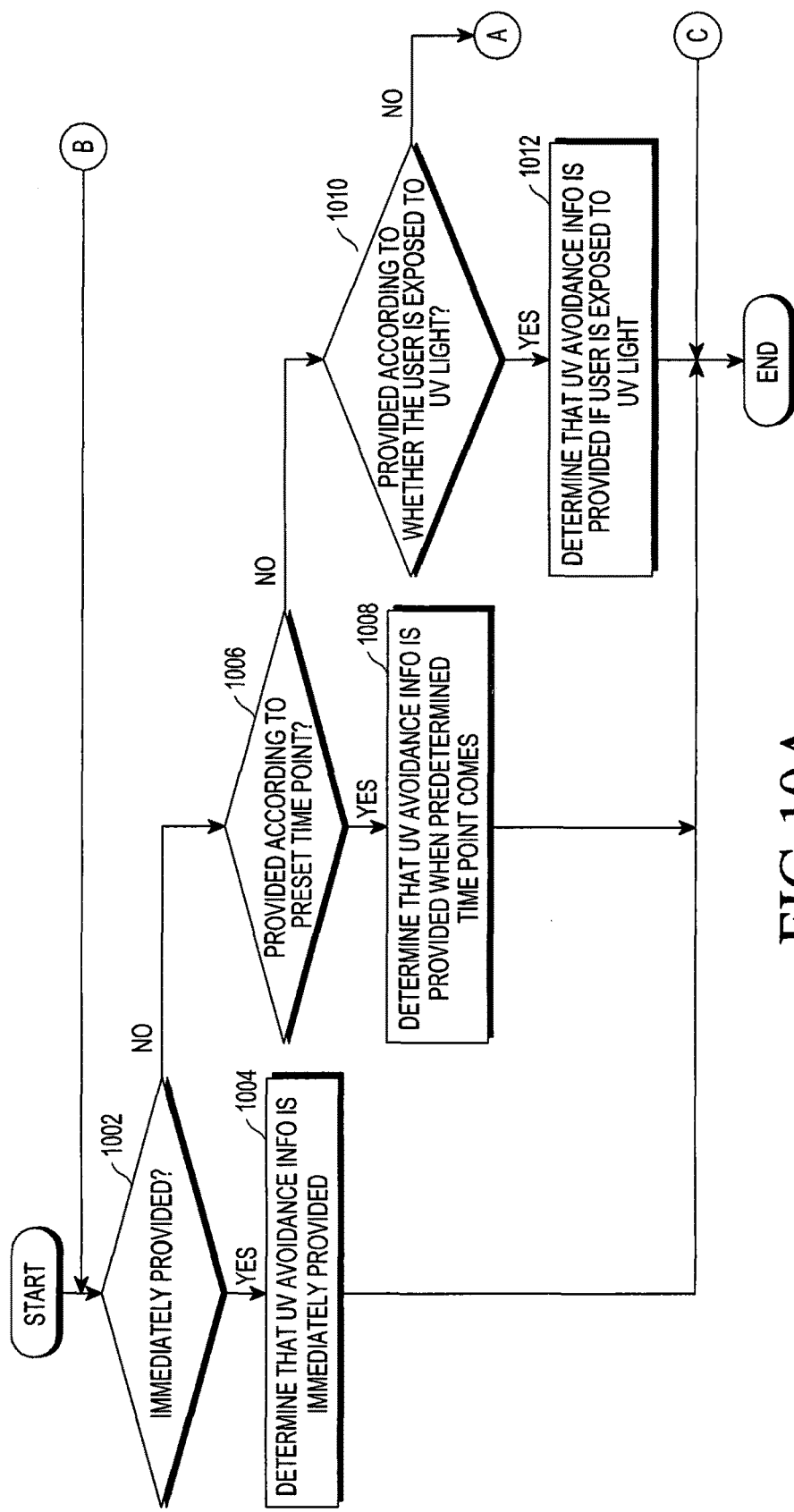
FIGS. 10A and 10B are a flowchart illustrating an operation of determining whether UV avoidance information is provided, according to an embodiment of the present disclosure.
Figure 10B:
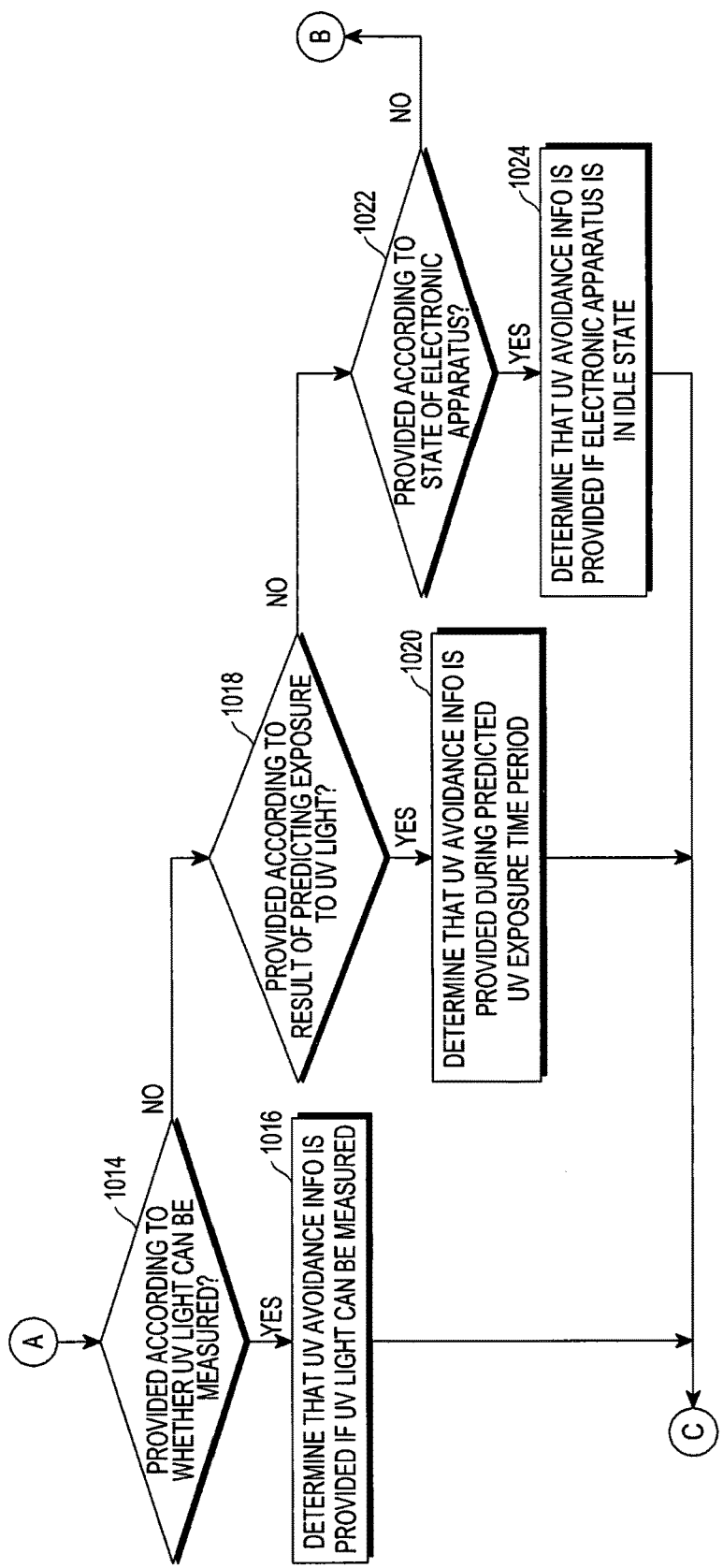

FIGS. 10A and 10B are a flowchart illustrating an operation of determining whether UV avoidance information is provided, according to an embodiment of the present disclosure.

First, referring to FIG. 10A, in step 1002, the electronic apparatus determines whether UV avoidance information is set to be immediately provided. When the UV avoidance information is set to be immediately provided, in step 1004, the electronic apparatus determines that the UV avoidance information is to be provided immediately after the user makes a request. When the UV avoidance information is immediately provided, the electronic apparatus acquires biometric information of the user and environment information of the user immediately after the user makes a request, calculates a UV blocking index, and provides UV avoidance information according to the calculated UV blocking index.

In step 1006, the electronic apparatus determines whether the UV avoidance information is set to be provided according to a preset time point. When the UV avoidance information is set to be provided according to the preset time point, in step 1008, the electronic apparatus determines that the UV avoidance information is provided at every preset time point. When the UV avoidance information is provided according to the preset time point, the electronic apparatus may periodically acquire biometric information of the user and environment information of the user at every preset time point, may calculate a UV blocking index, and may provide the UV avoidance information according to the calculated UV blocking index.

In step 1010, the electronic apparatus determines whether the UV avoidance information is set to be provided according to whether the user is exposed to UV light. When the UV avoidance information is set to be provided according to whether the user is exposed to UV light, in step 1012, the electronic apparatus determines that the UV avoidance information is provided if the user is exposed to UV light. When the UV avoidance information is provided according to whether the user is exposed to UV light, the electronic apparatus may acquire biometric information of the user and environment information of the user if the user is exposed to UV light, may calculate a UV blocking index, and may provide the UV avoidance information according to the calculated UV blocking index. For example, the electronic apparatus may determine whether the user is exposed to sunlight, by using the intensity of a GPS signal, may sense sunlight by using the light sensor, or may determine whether the user is exposed to UV light, according to whether to whether the electronic apparatus is connected to or disconnected from a particular network. The electronic apparatus may also determine whether the user is exposed to UV light, by using a result of the measurement by the UV sensor.

Referring to FIG. 10B, in step 1014, the electronic apparatus determines whether the UV avoidance information is set to be provided according to whether UV light can be measured. When the UV avoidance information is set to be provided according to whether UV light can be measured, in step 1016, the electronic apparatus determines that the UV avoidance information is provided, if UV light can be measured. When the UV avoidance information is provided according to whether UV light can be measured, the electronic apparatus may acquire biometric information of the user and environment information of the user if UV light can be measured, may calculate a UV blocking index, and may provide the UV avoidance information according to the calculated UV blocking index. According to an embodiment of the present disclosure, a situation in which the electronic apparatus is considered able to measure UV light if the detected sunlight exceeds a threshold.

In step 1018, the electronic apparatus determines whether the UV avoidance information is set to be provided according to a result of predicting the exposure to UV light. When the UV avoidance information is set to be provided according to a result of predicting the exposure to UV light, in step 1020, the electronic apparatus determines that the UV avoidance information is provided during a predicted UV exposure time period. A determination that exposure to UV light is predicted may occur when activity information on usual activity of the user is stored and the electronic device may predict that the user is going out on the basis of the stored activity information. For example, the user may be predicted to go out when the user moves towards to an exit of a building or other such structure or when the electronic device senses that the user is wearing clothes or shoes by using sensors, such as the motion sensor, the acceleration sensor, the location sensor, and/or indoor geographical information. Alternatively, the electronic device may predict that the user is going out by using a history of when the user goes out or a history of outdoor activity of the user, or by using a user-input time period for which the user is expected to go out. The prediction of the exposure to UV light may be determined according to whether use of an object (e.g., cosmetics, a wardrobe, clothes, shoes, accessories, a door, a mobile device, or keys) related to going out, or by analyzing movement information. The object may have an electronic tag attached thereto, or may have a communication unit and a sensor mounted thereon, and may directly or indirectly communicate with the electronic apparatus. Alternatively, the movement of the object may be detected by using the camera of the used electronic apparatus or the used external electronic apparatus, and a determination may be made of whether the object has been used. A UV exposure time period may be predicted by using schedule information of the user stored in the electronic apparatus or an external electronic apparatus. For example, the schedule information may include a location and appointed time points (i.e., a start time point and an end time point), and a UV exposure location and a UV exposure time period may be predicted based on the location and the appointed time points.

When a scheduled time period for which a user is going out is determined or the user goes out and thus a UV exposure location and the UV exposure time period are predicted, the electronic apparatus may measure a UV intensity or acquire UV intensity information at a current location or an expected activity location (e.g., a predetermined location or a usual location for a particular activity), and may provide the user with the UV avoidance information including a UV blocking index (e.g., an SPF and a PFA/PA) in view of biometric characteristics (e.g., a skin tone and a skin moisture level) of the user, which have been acquired by using the biometric sensors (e.g., the heart rate sensor, the GSR sensor, the body temperature sensor, the blood pressure sensor, etc.) included in the electronic apparatus or the sensors of the external electronic apparatus.

In step 1022, the electronic apparatus determines whether the UV avoidance information is set to be provided according to a state of the electronic apparatus. When the UV avoidance information is set to be provided according to the state of the electronic apparatus, in step 1024, the electronic apparatus determines that the UV avoidance information is provided if the electronic apparatus is in an idle state. For example, when the electronic apparatus is in a power-saving mode state for a predetermined time period, a display-off state, or a state where a user input does not exist, the electronic apparatus may acquire biometric information of the user and environment information of the user, may calculate a UV blocking index, and may provide the UV avoidance information according to the calculated UV blocking index. Alternatively, when the electronic apparatus is not in the idle state, the electronic apparatus determine to provide the UV avoidance information.

FIGS. 11A, 11B, 11C, 11D, 12A, 12B, and 12C are diagrams illustrating screens that provide UV avoidance information according to embodiments of the present disclosure.

First, referring to FIGS. 11A-11D, the electronic apparatus may display an information measurement screen 1100 required to provide UV avoidance information as illustrated in FIG. 11A. Previously-measured UV intensity information 1102 and a MEASURE button 1104 for requesting the measurement of information may be displayed on the information measurement screen 1100 required to provide UV avoidance information. When the MEASURE button 1104 is selected by the user, the electronic apparatus may display an information measurement screen 1110 required to provide UV avoidance information, as illustrated in FIG. 11B. An icon and text 1112, which notifies the user that information is being measured, may be displayed on the information measurement screen 1110 required to provide UV avoidance information. Information required to provide UV avoidance information may be biometric information of the user, environment information, or UV intensity information. When the measurement of the information required to provide UV avoidance information is completed, the electronic apparatus may display a UV avoidance information screen 1120 or 1130, as illustrated in FIG. 11C or 11D. The screen illustrated in FIG. 11C may be a UV avoidance information screen 1120 when UV intensity information is designated as "LOW". Information 1122, which represents that the UV intensity information is LOW, and information 1124, which is required to avoid UV light when the UV intensity information is "LOW", may be displayed on the UV avoidance information screen 1120 in the case where the UV intensity information is "LOW". The information 1124, which is required to avoid UV light when the UV intensity information is "LOW", may include at least one piece of information among information 1124-1 on wearing of sunglasses in the case where the UV intensity information is "LOW", information 1124-2 on a UV blocking index and a sunscreen in the case where the UV intensity information is LOW, and caution information 1124-3 for avoiding UV light when the UV intensity information is LOW. The screen illustrated in FIG. 11D may be a UV avoidance information screen 1130 when the UV intensity information is designated as "Extreme". Information 1132, which represents that the UV intensity information is "Extreme", and information 1134, which is required to avoid UV light when the UV intensity information is "Extreme", may be displayed on the UV avoidance information screen 1130 when the UV intensity information is "Extreme". The information 1134, which is required to avoid UV light when the UV intensity information is "Extreme", may include at least one piece of information among information 1134-1 on wearing of sunglasses and clothes in the case where the UV intensity information is Extreme, information 1134-2 on a UV blocking index and a sunscreen in the case where the UV intensity information is Extreme, caution information 1134-3 for avoiding UV light when the UV intensity information is Extreme, and information 1134-4 on prohibiting the user from going out when the UV intensity information is Extreme. Referring to FIG. 11E, the electronic apparatus may display UV intensity information by using one of multiple steps, such as "LOW", "MODERATE", "HIGH", "VERY HIGH", "EXTREME", etc.

Figures 12A, 12B, 12C:
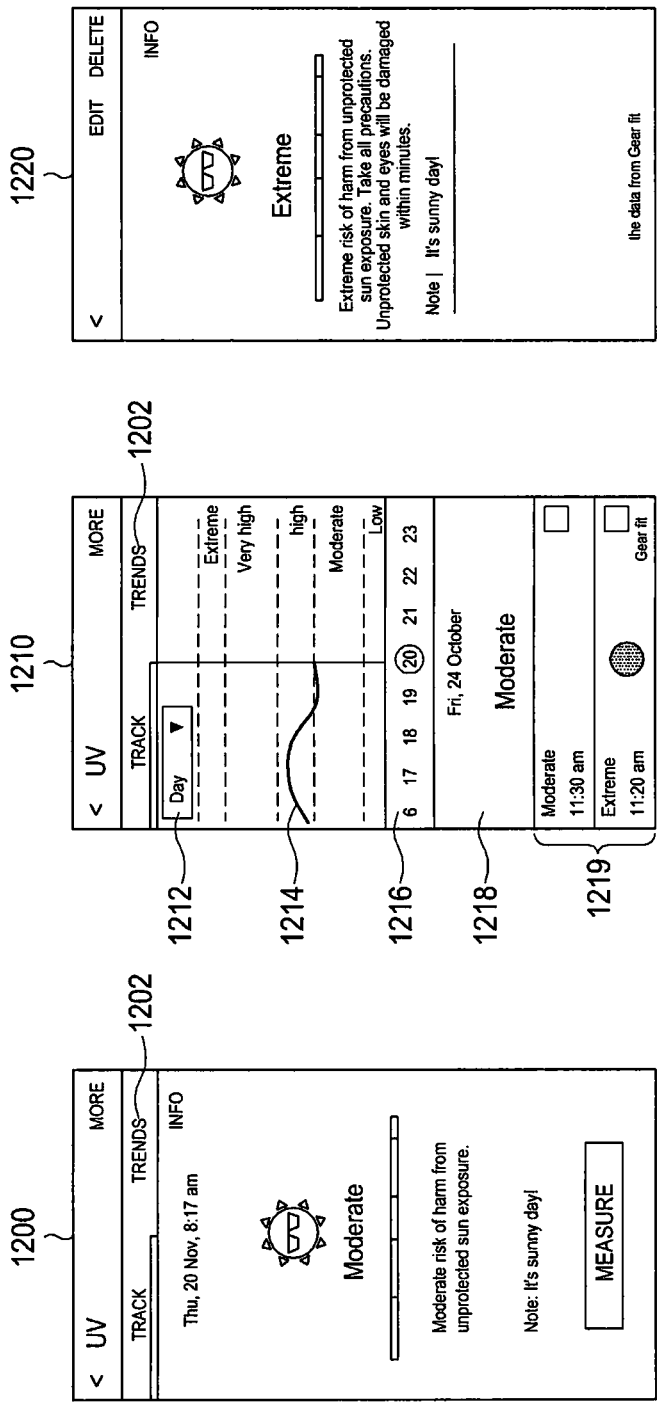

Meanwhile, referring to FIG. 12, when "TRENDS" 1202 is selected on an information measurement screen 1200 that provides UV avoidance information, as illustrated in FIG. 12A, the electronic apparatus may display a UV intensity change information screen 1210, as illustrated in FIG. 12B. A selection window 1212 for selecting a day, a month, or a year, a UV length change curve 1214, a date selection bar 1216, UV intensity information 1218 on a selected date, and pieces of UV intensity information 1219 according to respective hours of a selected date may be displayed on the UV intensity change information screen 1210. When one piece of the UV intensity information 1219 corresponds to a selected hour of the selected date, a UV avoidance information screen 1220 corresponding to the hour of the selected date may be displayed, as illustrated in FIG. 12C.

The above-described embodiments of the present disclosure, refer to a scenario in which the UV avoidance information may include a UV intensity index, a UV blocking index, sunscreen recommendation information, clothing information for avoiding UV light, and caution information for avoiding UV light. However, the UV avoidance information may further include at least one piece of information among sunscreen reapplication information and sunscreen application information. The sunscreen reapplication information may include a time interval for reapplying a sunscreen, the number of times of reapplying a sunscreen, etc. The sunscreen application information may include at least one of a part to which a sunscreen needs to be applied, whether a sunscreen has been applied, and a part to which it is further required to apply a sunscreen. The sunscreen application information may further include information on a time period during which the application of a sunscreen is maintained, or a sunscreen reapplication notification time period.

According to an embodiment of the present disclosure, the sunscreen reapplication information and the sunscreen application information may be displayed together with other pieces of UV avoidance information, as described above, and may be provided according to the occurrence of a separate event, or may be provided when the user makes a request.

Figure 13:
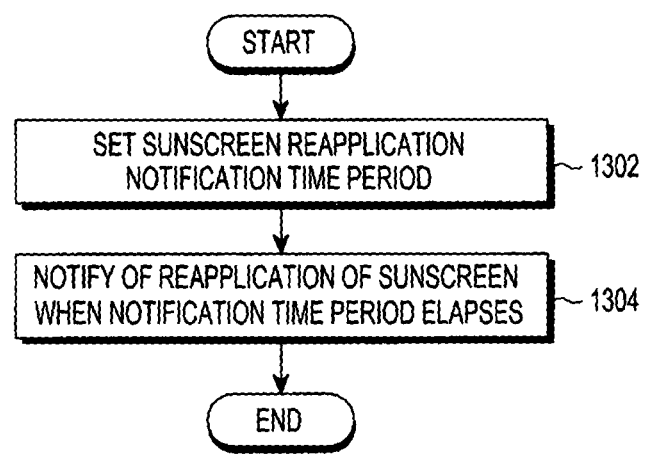
FIG. 13 is a flowchart illustrating an operation of an electronic apparatus for notifying of reapplication of a sunscreen according to an embodiment of the present disclosure.

FIG. 13 is a flowchart illustrating an operation of an electronic apparatus for notifying of reapplication of a sunscreen according to an embodiment of the present disclosure.

Referring to FIG. 13, in step 1302, the electronic apparatus sets a sunscreen reapplication notification time period. According to an embodiment of the present disclosure, the electronic apparatus may set a notification time period, so as to remind the user to perform reapplication of a sunscreen at a time point that exceeds an expected UV exposure time point, or immediately before the expected UV exposure time point, or may set the notification time period before a predetermined time period with a predetermined sunscreen reapplication time period as a reference.

For example, the FDA recommends that a sunscreen should be reapplied every two hours, and thus the electronic apparatus may set an expected UV exposure time period or a sunscreen reapplication notification time period to two hours. Alternatively, the electronic apparatus may set the expected UV exposure time period or the sunscreen reapplication notification time period in view of a time point, expected activity time points, an environment of an activity location, and the characteristics of the user which are received as input directly from the user. At this time, although it is expected to be exposed to UV light during an identical time period, according to a location and a time point, the expected UV exposure time period and the sunscreen reapplication notification time period may be adjusted or a notification cycle may be changed. For example, the effects of UVB light are strong at noon in summer, and thus the expected UV exposure time period may be reduced in view of a preset weight.

The electronic apparatus may also set a sunscreen reapplication notification time period by using measurement data obtained by various sensors, such as an acceleration sensor, a PPG sensor, an ECG sensor, a GSR sensor, a temperature sensor, an illuminance sensor, etc. For example, the electronic apparatus may set a sunscreen reapplication time period according to the an amount of activity the user is predicted to perform through at least one of the above-described sensors, or may set the sunscreen reapplication time period according to biometric information (e.g., a heart rate, the generation amount of sweat, and the moisture level of the skin) of the user, which is predicted through at least one of the above-described sensors. A method for setting a time period for notifying of reapplication of a sunscreen may be implemented according to various embodiments of the present disclosure. The electronic apparatus may calculate a sunscreen reapplication notification time period on the basis of measurement values obtained by the above-described various sensors. Alternatively, the electronic apparatus may adjust a sunscreen reapplication notification time period by giving a weight to a basic sunscreen reapplication notification time period (e.g., two hours). Alternatively, the electronic apparatus may set a sunscreen reapplication notification time period as a sunscreen reapplication notification time period which is pre-designated according to a measurement value for each step. Alternatively, the electronic apparatus may combine the above-described methods.

In step 1304, the electronic apparatus may perform a sunscreen reapplication notification when the set sunscreen reapplication notification time period elapses. According to an embodiment of the present disclosure, the sunscreen reapplication notification may be terminated when it is determined that the user is staying inside, when an expected UV exposure time period is completed, or when a predetermined termination time point is reached.

FIG. 14 is a table illustrating factors and characteristics used to set a sunscreen reapplication time period according to an embodiment of the present disclosure.

Referring to FIG. 14, with respect to time of day, a UVB intensity is highest for 11 a.m. to 1 p.m., and thus a sunscreen reapplication notification time period may be set to be relatively short for 11 a.m. to 1 p.m. With respect to time of year, UVA light has the strongest effect on the skin for May to June and UVB light has the strongest effect on the skin for July to August, and thus the sunscreen reapplication notification time period may be set to be short for May to June and for July to August. With respect to latitude, UV intensity is highest on the equator, and thus the sunscreen reapplication notification time period may be set to be relatively short when a location is the equator. With respect to elevation above sea level (altitude), UV light increases by 10 to 25% per kilometer. Accordingly, at high elevations, the sunscreen reapplication notification time period may be set to be relatively short. With respect to weather, the sunscreen reapplication notification time period may be set to be shorter when the sky has scattered small clouds than when clouds cover the whole sky. With respect to reflectivity of the earth's surface, reflectivity is higher when the user is on the snow than when the user is on the lawn. Accordingly, the sunscreen reapplication notification time period may be set to be shorter when the user is on the snow than when the user is on a lawn that is not covered in snow.

Figure 15:
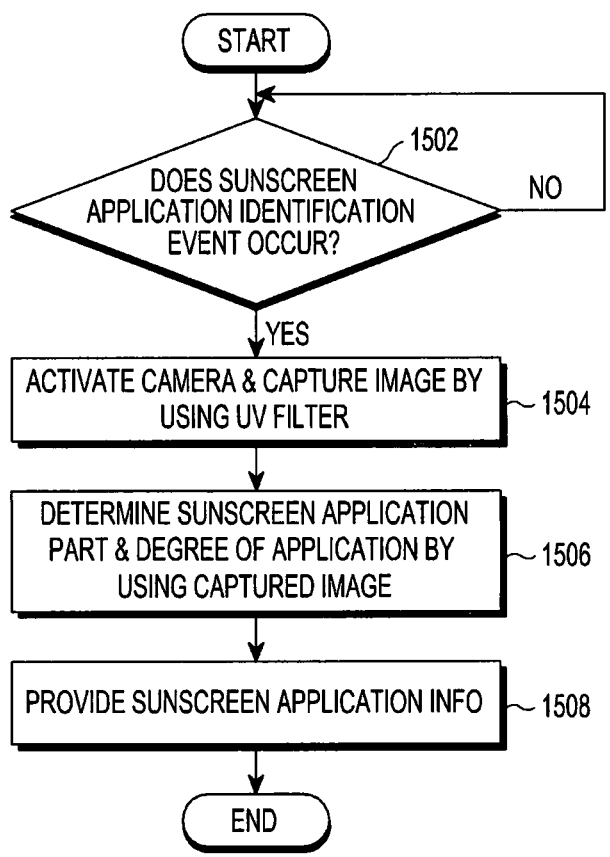
FIG. 15 is a flowchart illustrating an operation of an electronic apparatus for providing sunscreen application information according to an embodiment of the present disclosure.

FIG. 15 is a flowchart illustrating an operation of an electronic apparatus for providing sunscreen application information according to an embodiment of the present disclosure.

Referring to FIG. 15, in step 1502, the electronic apparatus determines whether a sunscreen application identification event occurs. According to an embodiment of the present disclosure, the sunscreen application identification event may occur in response to an event according to a request of the user or an event required when UV avoidance information is provided.

When the sunscreen application identification event has occurred, in step 1504, the electronic apparatus activates the camera module, and captures an image by using the UV filter.

In step 1506, the electronic apparatus determines a sunscreen application part and the degree of the application in the image captured by using the UV filter. According to an embodiment of the present disclosure, the electronic apparatus may recognize an area corresponding to a skin (e.g., a face, a hand, an arm, a leg, etc.) in the captured image, and determine the part, to which the sunscreen is applied, and also determine the degree of application in the area corresponding to the skin.

In step 1508, the electronic apparatus may provide the sunscreen application information by using the determined sunscreen application part and the determined degree of the application.

Figure 16:
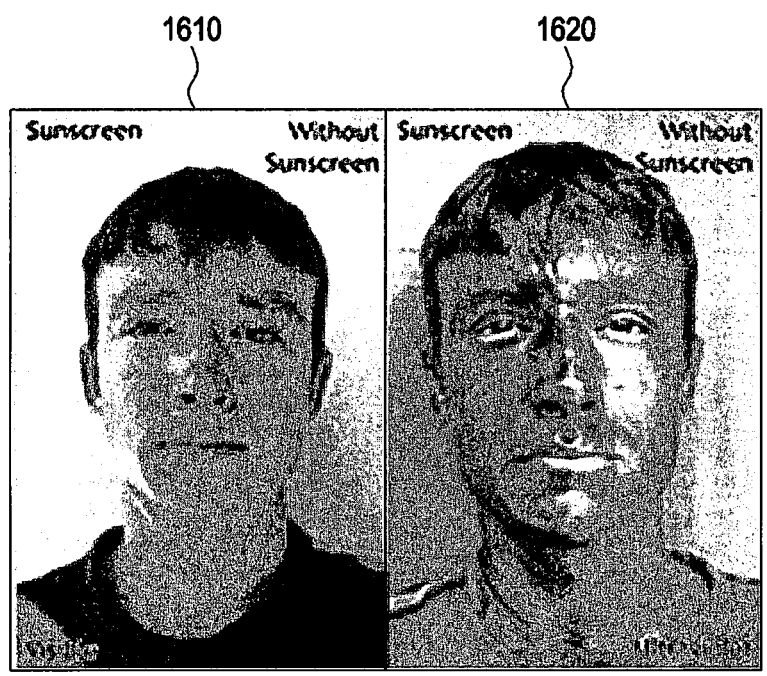
FIG. 16 is a view illustrating an image typically captured by an electronic apparatus and an image captured by using a UV filter thereby according to an embodiment of the present disclosure.

FIG. 16 is a diagram illustrating an image typically captured by an electronic apparatus and an image captured by using a UV filter thereby according to an embodiment of the present disclosure.

Referring to FIG. 16, the left image represents a typically-captured image 1610, and the right image represents an image 1620 captured by using a UV filter. The electronic apparatus may analyze the image 1620 captured by using a UV filter, determine a sunscreen application part and the degree of the application, and provide sunscreen application information according to a result of the determination.

According to an embodiment of the present disclosure, the sunscreen application information may include at least one of a part to which a sunscreen needs to be applied, whether a sunscreen has been applied, and a part to which it is further required to apply a sunscreen. The sunscreen application information may further include information on a time period during which the application of a sunscreen is maintained, or a sunscreen reapplication notification time period.

According to an embodiment of the present disclosure, an ultraviolet exposure situation of a user may be predicted, and ultraviolet avoidance information may be pre-provided before the user is exposed to ultraviolet light.

According to an embodiment of the present disclosure, the user may be notified to reapply a sunscreen.

Further, according to an embodiment of the present disclosure, when the user applies the sunscreen to the user's skin, the user may be notified of a state of the application of the sunscreen, and thereby may more appropriately apply the sunscreen to the user's skin.

According to an embodiment of the present disclosure, user-customized ultraviolet avoidance information can be provided by using biometric characteristics of the user, activity information of the user, surrounding environment information of the user, etc.

The above-described components of an electronic device according to various embodiments of the present disclosure may include one or more components, and a name of a corresponding component element may be changed based on the type of electronic device. An electronic device according to the present disclosure may include one or more of the aforementioned components or may further include other additional components, or some of the aforementioned components may be omitted. Further, some of the components of an electronic device according to an embodiment of the present disclosure may be combined to form a single entity, and thus, may execute functions equivalent to those of the corresponding separate elements prior to the combination.

The term "module" as used herein, may, for example, mean a unit including one of hardware, software, and firmware or a combination of two or more thereof. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to an embodiment of the present disclosure, at least some of the devices (e.g., modules or functions thereof) or the methods (e.g., operations) according to the present disclosure may be implemented by a command stored in a computer-readable storage medium in a programming module form. The corresponding instructions, when executed by one or more processors (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), etc. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa. According to an embodiment of the present disclosure, in a storage medium that stores a program for providing UV avoidance information, a program may cause the electronic apparatus to perform operations including: detecting biometric information, environment information, and UV intensity information; and providing UV avoidance information on the basis of the biometric information, the environment information, and the UV intensity information. A module or a program module, according to various embodiments of the present disclosure, may include at least one of the above-described elements, may have some of the above-described elements omitted therefrom, or may further include other additional elements. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:
1. An electronic apparatus comprising:
a display;
a camera;
a biometric information acquisition module that includes at least one sensor, acquires biometric information of a user, and acquires first activity information of the user using the at least one sensor;
a location information acquisition module that acquires location information of a particular location;
an ultraviolet intensity information acquisition module that acquires ultraviolet intensity information corresponding to the acquired location information;
a communication module that receives second activity information of the user from an external device; and
a processor is configured to
determine a prediction of an exposure to ultraviolet rays based on at least one of the first activity information of the user and the second activity information of the user,
set an expected exposure time period by the prediction of the exposure to the ultraviolet rays,
control the display to display ultraviolet avoidance information for avoiding the ultraviolet rays at the particular location based on the acquired biometric information, the acquired ultraviolet intensity information, and the expected exposure time period, determine a sunscreen application part and an application degree in an image captured by the camera using an ultraviolet filter, and control the display to display sunscreen application information, when the sunscreen application information is provided.

2. The electronic apparatus as claimed in claim 1, wherein the biometric information comprises at least one of an amount of activity of the user, an amount of sweat generated by the user, a body temperature of the user, a skin moisture level of the user, a skin tone of the user, and melanin information of the user.

3. The electronic apparatus as claimed in claim 1, wherein the location information acquisition module acquires, together, the location information and at least one of latitude and longitude information corresponding to the location information, information on the Sun corresponding to the location information, and weather information corresponding to the location information.

4. The electronic apparatus as claimed in claim 3, wherein the location information comprises one of current location information of the user and selected location information.

5. The electronic apparatus as claimed in claim 1, wherein the processor is further configured to control the display to display the ultraviolet avoidance information according to one of a current time point, a preset time point, whether the user is exposed to the ultraviolet rays, whether the electronic device is capable of measuring the ultraviolet rays, a result of a prediction of whether the user will be exposed to the ultraviolet rays, and a state of the electronic apparatus.

6. The electronic apparatus as claimed in claim 1, wherein the ultraviolet avoidance information comprises at least one of an ultraviolet intensity index, sunscreen recommendation information, clothing information for blocking the ultraviolet rays, caution information that expresses caution about the ultraviolet rays, sunscreen reapplication information, and the sunscreen application information.

7. The electronic apparatus as claimed in claim 6, wherein the processor is further configured to calculate a sunscreen reapplication notification time period and to control the display to display a sunscreen reapplication notification if the sunscreen reapplication notification time period elapses, when the sunscreen reapplication information is provided.

8. A method for providing ultraviolet avoidance information by an electronic apparatus, the method comprising:
acquiring biometric information of a user;
acquiring first activity information of the user using at least one sensor of the electronic apparatus;
receiving second activity information of the user from an external device;
acquiring location information of a particular location;
acquiring ultraviolet intensity information corresponding to the acquired location information;
determining a prediction of an exposure to ultraviolet rays based on at least one of the first activity information of the user and the second activity information of the user;
setting an expected exposure time period by the prediction of the exposure to the ultraviolet rays;
displaying, on a display, ultraviolet avoidance information for avoiding the ultraviolet rays at the particular location based on the acquired biometric information, the acquired ultraviolet intensity information, and the expected exposure time period;
determining a sunscreen application part and an application degree in an image captured by a camera using an ultraviolet filter; and
displaying, on a display, sunscreen application information, when the sunscreen application information is provided.

9. The method as claimed in claim 8, wherein the biometric information comprises at least one of an amount of activity of the user, an amount of sweat generated by the user, a body temperature of the user, a skin moisture level of the user, a skin tone of the user, and melanin information of the user.

10. The method as claimed in claim 8, wherein at least one of latitude and longitude information corresponding to the location information, information on the Sun corresponding to the location information, and weather information corresponding to the location information is acquired together with the location information.

11. The method as claimed in claim 10, wherein the location information comprises one of current location information of the user and selected location information.

12. The method as claimed in claim 8, wherein the ultraviolet avoidance information is displayed according to one of a current time point, a preset time point, whether the user is exposed to the ultraviolet rays, whether the ultraviolet rays is capable of being measured, a result of a prediction of whether the user will be exposed to the ultraviolet rays, and a state of the electronic apparatus.

13. The method as claimed in claim 8, wherein the ultraviolet avoidance information comprises at least one of an ultraviolet intensity index, sunscreen recommendation information, clothing information for blocking the ultraviolet rays, caution information that expresses caution about the ultraviolet rays, sunscreen reapplication information, and the sunscreen application information.

14. The method as claimed in claim 13, wherein a sunscreen reapplication notification time period is calculated, and a sunscreen reapplication notification is displayed if the sunscreen reapplication notification time period elapses, when the sunscreen reapplication information is provided.

15. A non-transitory storage medium that stores a program for providing ultraviolet avoidance information, the program causing an electronic apparatus to perform operations comprising:
acquiring biometric information of a user;
acquiring first activity information of the user using at least one sensor of the electronic apparatus;
receiving second activity information of the user from an external device;
acquiring location information of a particular location;
acquiring ultraviolet intensity information corresponding to the acquired location information;
determining a prediction of an exposure to ultraviolet rays based on at least one of the first activity information of the user and the second activity information of the user;
setting an expected exposure time period by the prediction of the exposure to the ultraviolet rays;
displaying, on a display, ultraviolet avoidance information for avoiding the ultraviolet rays at the particular location based on the acquired biometric information, the acquired ultraviolet intensity information and the expected exposure time period;
determining a sunscreen application part and an application degree in an image captured by a camera using an ultraviolet filter; and
displaying, on a display, sunscreen application information, when the sunscreen application information is provided.

* * * * *